(12) United States Patent
Umeki

(10) Patent No.: US 7,195,732 B2
(45) Date of Patent: Mar. 27, 2007

(54) METHOD AND MOLD FOR FABRICATING ARTICLE HAVING FINE SURFACE STRUCTURE

(75) Inventor: Kazuhiro Umeki, Iwate (JP)

(73) Assignee: Ricoh Optical Industries Co., Ltd., Hanamaki (JP)

( * ) Notice: Subject to any disclaimer, the term of this patent is extended or adjusted under 35 U.S.C. 154(b) by 434 days.

(21) Appl. No.: 10/666,257

(22) Filed: Sep. 22, 2003

(65) Prior Publication Data

US 2004/0135293 A1     Jul. 15, 2004

(30) Foreign Application Priority Data

Sep. 18, 2002  (JP)  ............................. 2002-271253
Jun. 2, 2003   (JP)  ............................. 2003-156094

(51) Int. Cl.
    *B29C 33/38*   (2006.01)
(52) U.S. Cl. .......................... 264/496; 216/2; 264/219; 264/220; 264/494
(58) Field of Classification Search ................ 264/219, 264/220, 494, 496; 216/2
See application file for complete search history.

(56) References Cited

U.S. PATENT DOCUMENTS 4,528,260 A  *  7/1985  Kane ........................... 430/321
4,847,026 A  *  7/1989  Jarboe et al. ............... 264/46.7
4,867,922 A  *  9/1989  Zuccato ...................... 264/40.1

FOREIGN PATENT DOCUMENTS

JP       2001-356470       12/2001
JP       2002-192500        7/2002

OTHER PUBLICATIONS

"Optical and Electro-Optical Engineering Contact", vol. 38, No. 5, pp. 42-51, 2000.
Japan Society of Applied Physics, vol. 68, No. 6, pp. 633-638, "Applied Physics", 1999.

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

A method of fabricating a mold and a method of fabricating an article with the mold is disclosed that is capable of fabricating a high three-dimensional surface structure and extending the service life of the mold. A mold having a fine surface shape of a height less than an object height is fabricated, then the fine surface shape of the mold is transferred to an intermediate mold by dry-etching, and then the fine surface shape of the intermediate mold is further transferred to a final article material by dry-etching. In each transfer step by dry-etching, the etching selection ratio is appropriately adjusted to increase the height of the fine surface structure step by step, so that the fine surface shape of the final article material has the object height. On the surface of the final article material, a preliminary pattern of the object surface shape may be formed beforehand to reduce the required thickness of the curable resin.

25 Claims, 13 Drawing Sheets

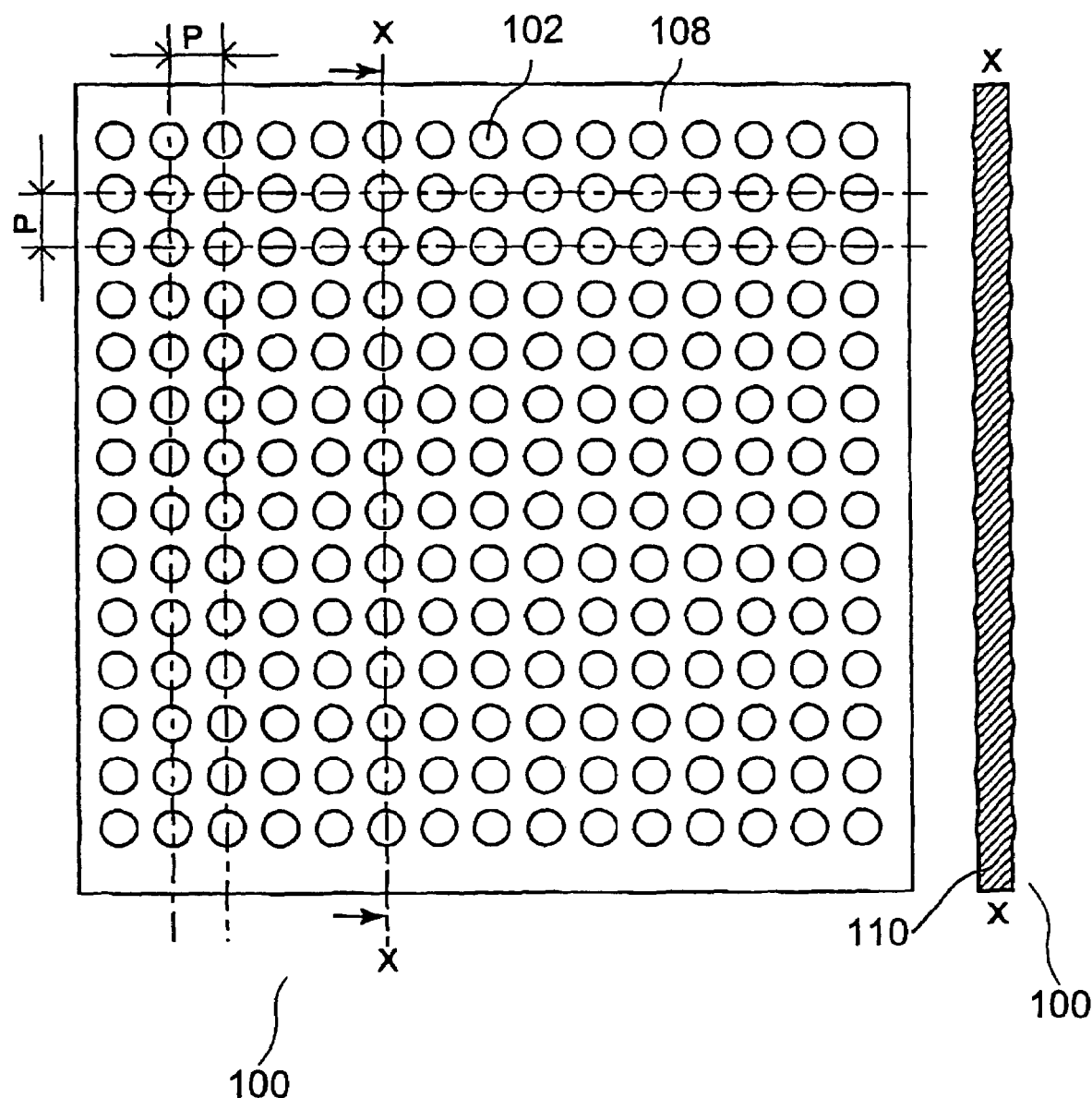

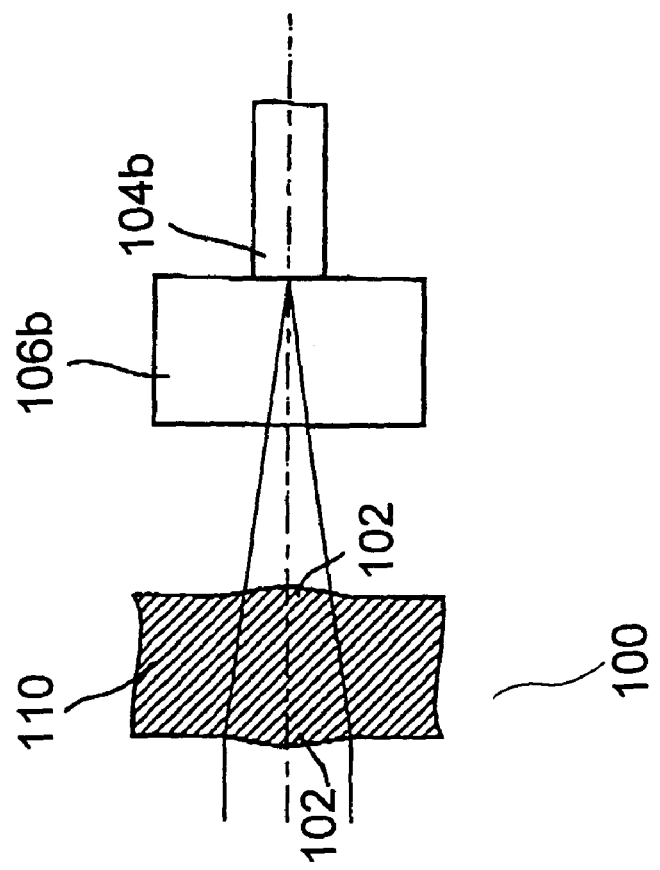
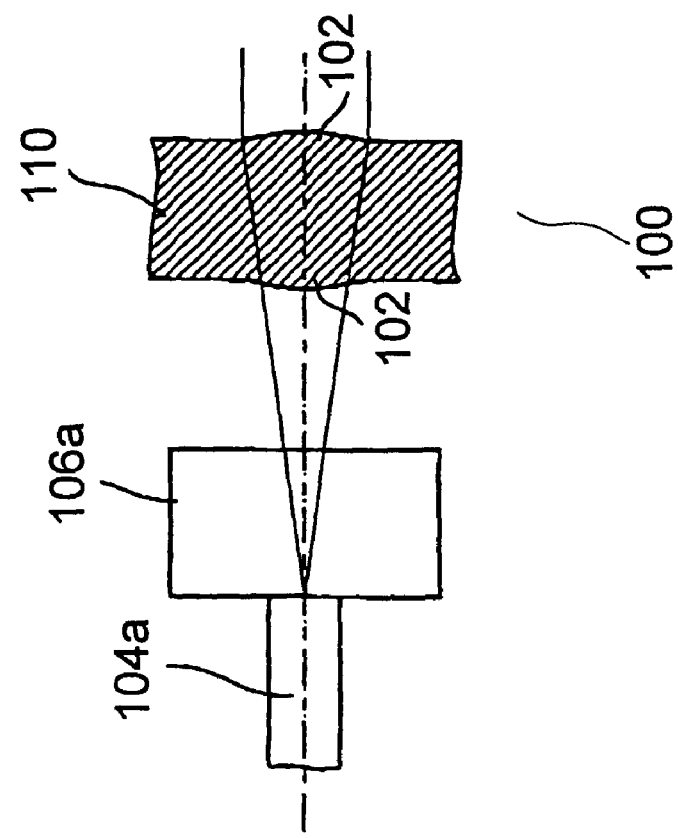
FIG.7A
FIG.7B

METHOD AND MOLD FOR FABRICATING ARTICLE HAVING FINE SURFACE STRUCTURE

BACKGROUND OF THE INVENTION

1. Field of the Invention

The present invention relates to a method of fabricating a fine structure on a surface of an article to produce new optical, mechanical, or physical properties of the article. This method of fabricating a fine structure is applicable to fabrication of, for example, a MLA (micro-lens array), a diffractive optical element, a deflecting optical element, a refractive optical element, a complex refractive optical element, a fiber-related optical element, a beam splitter, and so on. Particularly, this method of fine structure fabrication is suitable for fabrication of an optical element having a dimension less than about 10 mm. Furthermore, this method is applicable to a surface treatment for a micro-machine, mechanically swingable parts of an automobile engine, a compressor of an air conditioner, and articles in various other fields.

2. Description of the Related Art

In the related art, quite a few techniques have been proposed for fabrication of a fine surface structure. These techniques are described below.

(A) The reference "Optical and Electro-optical Engineering Contact", Vol. 38, No. 5, pp. 42–51 (2000) (particularly, descriptions on page 45) discloses a method of fabricating a multi-level element by lithography, which involves using a number of M masks and through a number of M−1 steps of treatments to produce an element having a step-like phase distribution having $N=2^M$ levels.

(B) The reference "Applied Physics", Vol. 68, No. 6, pp. 633–638 (1999), published monthly by the Japan Society of Applied Physics, discloses a technique which combines methods of photolithography, dry etching, and direct writing using an electron beam, a laser beam, or an ion beam.

(C) Japanese Laid Open Patent Application No. 2001-356470 discloses a method involving fabricating a three-dimensional structure on a photo-conducting material by using a transmittance variable mask, and transferring the structure to the material of a final article by dry etching. Here, a transmittance variable mask is a mask that has a distribution of light transmittance in the thickness direction of the mask in addition to a pattern in the plane of the mask.

(D) Japanese Laid Open Patent Application No. 2002-192500 discloses a method in which a mold is fabricated in advance, and the surface shape of the mold is transferred to a resin, moreover the structure on the resin is transferred to the material of a final article by dry etching.

Among the methods above, method (A) requires a large number of masks, and non-negligible uncertainties produced by a large number of times of alignment. In addition, method (A) suffers from non-negligible etching errors in the thickness direction, and the minimum line width achievable with method (A) is 1 μm.

Method (B) requires an apparatus capable of high precision control, therefore, the apparatus is costly. In addition, the writing time using an electron beam, a laser beam, or an ion beam is long in method (B). As an numeral example, about 10 to 15 hours are needed to write a square area of 500 μm×500 μm. Because of poor mass-productivity and reproducibility of method (B), it has not been put into practical use.

In contrast, methods (C) and (D) are capable of producing three-dimensional surface structures with high precision and good reproducibility. Further, method (D) has a low fabrication cost because of usage of a mold for transfer of the surface structure.

However, there exists a difficulty in fabricating a fine surface structure on an object material by using dry etching as in method (D).

Considering the application of an article having a fine surface structure, the height of the surface structure is important. For example, in the case of an optical lens, a higher fine structure of the optical lens implies an increased numeral aperture and hence greater illuminance. But fabrication of a high surface structure is difficult because a large amount of the object material has to be etched. As a result, processing time (here, the etching time) becomes long, and fabrication precision degrades exponentially with the etching time.

In addition, when using a mold to fabricate a fine structure, because the mold is repeatedly used a large number of times, the service life of the mold is short.

SUMMARY OF THE INVENTION

The present invention relates to improvements of method (C), and especially method (D), and a first object of the present invention is provide a method of fabricating a mold and a method of fabricating an article with the mold capable of fabricating a three dimensional surface structure of a large size.

A second object of the present invention is to provide a method of fabricating a mold and a method of fabricating an article with the mold capable of extending the service life of the mold for fabricating the three dimensional surface structure.

According to a first aspect of the present invention, there is provided a method for fabricating an article from an object material including an object fine surface structure thereon having an object size, the method comprising: a first step of fabricating a first mold from a first material, said first mold including a fine surface structure corresponding to the object fine surface structure and having a first size less than the object size; a second step of fabricating a second mold by transferring the fine surface structure of the first mold to a second material so that the fine surface structure transferred to the second material has a second size greater than the first size and less than the object size; a third step of fabricating the article by transferring the fine surface structure of the second mold to the object material so that the fine surface structure transferred to the object material has the object size.

Preferably, the second step comprises: a step of applying a first curable resin onto the first mold to cover the fine surface structure thereof, and pressing the second material against the first mold with the first curable resin in between to transfer the fine surface structure of the first mold to the first curable resin; a first curing step of curing at least a portion of the first curable resin; a first separating step of separating the first curable resin from the first mold with the first curable resin being bonded with the second material; and a first transferring step of transferring the fine surface structure of the first curable resin to the second material by dry-etching to form the second mold. The third step comprises: a step of applying a second curable resin onto the second mold to cover the fine surface structure thereof and pressing the object material against the second mold with the second curable resin in between to transfer the fine surface structure of the second mold to the second curable resin; a second curing step of curing at least a portion of the second curable resin; a second separating step of separating the second curable resin from the second mold with the second curable resin being bonded with the object material; and a second transferring step of transferring the fine surface structure of the second curable resin to the object material by dry-etching to form the article.

Preferably, before the third step, the first step and the second step are repeated a plurality of times to fabricate a plurality of second molds.

Preferably, the method further comprises a step of performing a first de-molding treatment on the first mold to facilitate separation of the first curable resin from the first mold after the first step and before the second step; and a step of performing a second de-molding treatment on the second mold to facilitate separation of the second curable resin from the second mold after the second step and before the third step.

Preferably, the first transferring step includes a step of changing a dry-etching selection ratio of etching the first curable resin and the second material; and the second transferring step includes a step of changing a dry-etching selection ratio of etching the second curable resin and the object material.

Although there are numerous methods of fabricating a fine surface structure on an object material in the related art, when molds and dry etching are used, the fabrication of high object shape is difficult.

According to the present invention, two or more molds are used, and in two or more subsequent steps of surface structure transfer using dry-etching, etching conditions are set so that each newly formed fine structure has a size greater than that in the preceding transfer step. In this way, for example, the height of the transferred fine structure is sufficiently low for precise etching in each single surface structure transfer step, but the object height can be attained in the last surface structure transfer step. By increasing the number of steps of surface structure transfer, it is possible to increase the height of the transferred surface structure gradually.

In addition, because a de-molding treatment is performed on the surface of each mold, it is possible to easily strip off the curable resin from the molds. This enables a longer service life of the molds, and higher quality of the transferred surface structure. Further, because a number of molds are used, the frequency of using each single mold is reduced, and therefore, the service life of each single mold is increased.

In addition, by controlling the etching selection ratio in dry-etching, the desired surface structure can be formed on the next mold.

According to a second aspect of the present invention, there is provided a method for fabricating an article from an object material including an object fine surface structure having one or more elements, the method comprising: a first step of fabricating a surface structure substrate by forming a preliminary surface structure on the object material, said preliminary surface structure having elements corresponding to the elements of the object fine surface structure; a second step of fabricating a mold from a mold material, the mold including a fine surface structure having elements equivalent to the elements of the object fine surface structure in shape; and a third step of fabricating the article by transferring shapes of elements of the fine surface structure of the mold to the corresponding elements of the preliminary surface structure on the surface structure substrate to form the elements of the object fine surface structure.

Preferably, the third step comprises: a step of applying a curable resin onto the mold to cover the fine surface structure thereof and pressing the surface structure substrate against the mold with the curable resin in between to transfer the fine surface structure of the mold to the curable resin, the elements of the fine surface structure of the mold being aligned to the corresponding elements of the preliminary surface structure on the surface structure substrate; a curing step of curing at least a portion of the curable resin; a separating step of separating the curable resin from the mold with the curable resin being bonded with the surface structure substrate; and a transferring step of transferring the fine surface structure of the curable resin to the surface structure substrate by dry-etching to form the article.

Preferably, the preliminary surface structure may be formed by one of the methods of sandblasting, dry etching, wet etching, dicing, polishing, cutting, sol-gel method, glass bonding, and thin film formation including vacuum evaporation, sputtering, and CVD (Chemical Vapor Deposition).

As mentioned above, when dry etching is used to fabricate a fine surface structure on an object material using a mold, fabrication of a high object surface structure is difficult. According to the present invention, a preliminary fine surface structure similar to the object fine surface structure is formed on the object material in advance with the elements of the preliminary fine surface structure being smaller than the elements of the object fine surface structure. When transferring the fine surface structure formed on the mold to the object material, the elements of the fine surface structure of the mold are positioned in alignment to the corresponding elements of the preliminary surface structure. In doing this, the amount of the resin and object material to be etched is roughly equivalent to the difference between the size of elements of the object fine surface structure and the size of elements of the preliminary surface structure. Therefore, the amount of the object material to be etched in dry-etching can be reduced, and this reduces etching time.

In addition, because it is not necessary to fabricate a preliminary surface structure as precise as a fine surface structure of a final article, the preliminary surface structure can be fabricated in various ways, making the fabrication of the preliminary surface structure easy.

According to a third aspect of the present invention, there is provided a method of fabricating a mold, comprising the steps of: applying a photo-conducting material onto a surface of a mold material; irradiating light onto the photo-conducting material using a mask having a light transmittance distribution, and developing the photo-conducting material to form a predetermined pattern on the photo-conducting material; and transferring the pattern to the mold material by dry-etching.

According to a fourth aspect of the present invention, there is provided a method of fabricating a mold from a mold material for transferring thereto a shape on a primary mold, comprising the steps of: applying a curable resin onto the primary mold to cover the shape and pressing the mold material against the primary mold with the curable resin in between so as to transfer the shape on the primary mold to the curable resin; curing at least a portion of the curable resin; separating the curable resin from the primary mold with the curable resin being bonded with the mold material; and transferring the shape on the curable resin to the mold material by dry-etching to form the mold.

Preferably, the method further comprises a step, before applying the curable resin, of performing a de-molding treatment on the primary mold to facilitate separation of the curable resin from the primary mold. More preferably, the method further comprises a step, before applying the curable resin, of performing a surface treatment on the primary mold to increase adhesion between the curable resin and the mold material.

According to a fifth aspect of the present invention, there is provided a mold for transferring a shape thereon to an object material by pressing the object material against the mold with a curable resin in between to transfer the shape to the curable resin, curing at least a portion of the curable resin and transferring the shape on the curable resin to the object material, the mold comprising: a channel for an uncured portion of the curable resin surrounding the cured portion of the curable resin to flow in to fill in a space generated due to shrinkage of the curable resin during curing.

These and other objects, features, and advantages of the present invention will become more apparent from the following detailed description of preferred embodiments given with reference to the accompanying drawings.

BRIEF DESCRIPTION OF THE DRAWINGS

FIGS. 6A and 6B are a plan view and a cross-sectional view, respectively, showing a configuration of the optical element 100, where the cross-sectional view in FIG. 6B is obtained along the X—X line in FIG. 6A;

FIGS. 7A and 7B are partial cross-sectional views showing the optical element 100 for coupling two fibers 104a and 104b;

DESCRIPTION OF THE PREFERRED EMBODIMENTS

Figure 1:
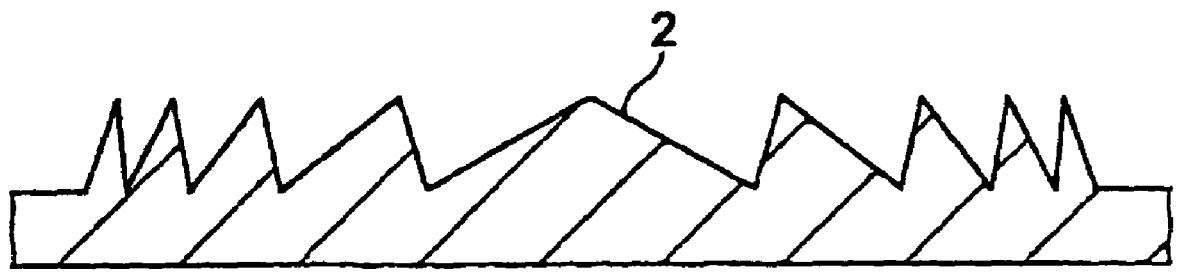
FIG. 1 is a cross-sectional view of a diffractive element 2 fabricated by the method of the present invention.

Below, preferred embodiments of the present invention are explained with reference to the accompanying drawings.

First, embodiments related to the first aspect of the present invention are described.

UV curable resins or thermosetting resins can be used to transfer an inversion of a surface shape of a mold or an intermediate mold.

The advantages of using a UV curable resin as a transfer resin are as follows. First, curing at normal temperature is possible with the UV curable resins. Second, the UV curable resins can be applied to other materials in liquid phase, therefore fluidity of the UV curable resins is good, preventing occurrence of bubbles. Third, UV light irradiation is uniform, and therefore the UV curable resins can be cured uniformly. Fourth, the curing time is short with a UV curable resin. Fifth, a large number of UV curable resins having a small rate of shrinkage have been developed, hence, there are more choices. Sixth, there are more degrees of freedom in molecular design having plasma resistance.

As a result, the UV curable resins enable more precise and easier transfer of a surface shape of a mold or an intermediate mold.

When using a thermosetting resin as a transfer resin, uniform curing can be obtained, and the same as the UV curable resin, it is possible to precisely transfer the surface shape of the mold or the intermediate mold. As a thermosetting resin, use can be made of resins employed in fabrication of plastic glasses lenses and contact lenses. Molding using a thermosetting resin is called casting, and it involves feeding a liquid thermosetting resin to a mold, and heating up the resin gradually for 24 hours to cure the resin.

When an ultraviolet (UV) light curable resin is used as the curable resin, and the UV curable resin on a mold is exposed to ultraviolet light to be hardened, as the materials of the mold, it is preferable to use any material that is heat resistant and has light transmittance at least at a specific wavelength range to allow the ultraviolet light to enter to cure the UV curable resin, such as synthetic silica, heat-resistant glass, and others. As the heat-resistant glass, for example, Pyres (a registered trade mark), NeoCeram (a registered trade mark), and the like may be used. Further, the same materials as described above may be used as intermediate materials to form intermediate molds.

For fabricating a mold having a fine surface shape of a dimension not less than 1 mm, commercial high precision manufacturing machines can be used, for example, an NC lathe and an NC ultra precision manufacturing machine. If the dimension of the fine surface shape of the mold is less than 1 mm, the mold can be fabricated, for example, by the method proposed by the present inventors as disclosed in Japanese Laid Open Patent Application No. 2001-356470, or the mold can be fabricated from glass or metals by means of lithography or wet etching.

If the surface shape of the mold is a fine structure and the dimension thereof is not greater than 10 μm, the method proposed by the present inventors as disclosed in Japanese Laid Open Patent Application No. 2002-192500 can be employed to fabricate the mold, which involves irradiating an electron beam (EB) or a laser beam on a resist (made from a photo-conducting material) formed on the surface of the base material of the mold to form a desired structure thereon, then developing the surface of the resist to obtain the fine structure (this is the so-called direct writing), and then transferring the fine structure to the base material of the mold by dry etching.

In detail, this method for making a mold having a fine surface shape may include the following detailed steps:

(a) applying a photo-conducting material onto the surface of the base material of the mold, (b) exposing the photo-conducting material to a laser beam or an electron beam by using the aforesaid transmittance variable mask, developing the photo-conducting material, and forming a desired shape on the photo-conducting material, and (c) transferring the shape on the photo-conducting material to the base material of the mold by dry etching.

Here, a transmittance variable mask is a mask which has a distribution of light transmittance in the thickness direction of the mask in addition to a pattern in the plane of the mask.

In this way, by transferring the surface shape of the resist to the base material of the mold, shape transfer from a resist made of a soft material to a mold made of a hard material becomes possible.

The method of fabricating an intermediate mold may include the following steps.

(a) performing a de-molding treatment on the surface of the primary mold, (b) applying a curable resin onto the surface of the primary mold, and pressing the material of the intermediate mold against the surface of the primary mold with the curable resin in between to transfer an inversion of the surface shape of the primary mold to the resin, (c) curing the resin after the shape transfer in step (b), (d) separating the cured resin from the primary mold, with the cured resin being bonded with the material of the intermediate mold, and (e) transferring the surface shape on the resin to the material of the intermediate mold by dry etching.

When fabricating a mold by dry etching, materials able to be treated by dry etching should be used for the mold, for example, metals, glasses, ceramics, plastics, hard rubbers, and the like can be used.

When transferring the shape on a photo-conducting material to the material of a mold by dry etching, in order for precise shape transfer, it is preferable to change the etching selection ratio continuously or stepwise. In doing so, the surface shape on the resist (the photo-conducting material) can be transferred to the mold as desired.

In a de-molding treatment of the surface of a mold or an intermediate mold, for example, a metallic thin film may be formed on the surface of the mold or the intermediate mold. This metal film can be formed by a single metal element such as Ni, Cr, Fe, Al, Co, Cu, Mo, Pt, Au, Nb, Ti, and others, or composite metal materials. By the de-molding treatment, quality of the transferred shape from the mold or the intermediate mold is greatly improved, specifically, precise shape transfer is possible, and at the same time, separation of the resin from the mold or the intermediate mold becomes easier. This greatly extends the service life of the mold or the intermediate mold.

In the de-molding treatment, it is preferable to treat the surface by further forming a layer including a fluorocarbon resin on the metal film. For example, the layer including the fluorocarbon resin may be formed by coating or evaporation.

As another preferable de-molding treatment on the surface of a mold or an intermediate mold, a layer of a fluorinated organic compound may be formed on the surface of the mold or the intermediate mold.

When the UV curable resin is used for transferring the inversion of the surface of a mold or an intermediate mold, preferably, the UV curable resin can be cured in the following way. Among the material of the mold, the intermediate material, and the material of the final article, at least one of the two materials sandwiching the UV curable resin irradiated by the ultraviolet light in shape transfer is made from a light transmitting material that allows transmission of light in the wavelength range in which the ultraviolet light causes the UV curable resin to set. When curing the UV curable resin, if one of the two materials is a light transmitting material, an arrangement can be made so that the light passes through the light transmitting material and irradiates the UV curable resin to cure the resin uniformly; if both the two materials are light transmitting materials, an arrangement can be made so that the light passes through one or both of the light transmitting materials and irradiates the UV curable resin to cure the resin uniformly. By uniformly curing the UV curable resin, the shape transfer property of the mold or the intermediate mold can be greatly improved, enabling precise shape transfer.

When the thermosetting resin is used for transferring the inversion of the surface of a mold or an intermediate mold, preferably, the thermosetting resin can be cured as in the following way. A group of the mold and the intermediate material and a group of the intermediate mold and the material of the final article are fixed at specified positions; a resin feeding port is provided separately, and from a resin feeding port the thermosetting resin is fed between the mold and the intermediate material or the intermediate mold and the material of the final article; then the whole set including the thermosetting resin is heated gradually so that heat propagates uniformly over the mold and the material sandwiching the thermosetting resin.

Generally, a resin shrinks during curing. To take this into consideration, the amount of shrinkage of the resin is estimated in advance, and when fabricating a mold or an intermediate mold, which are used to transfer a shape to the resin, it is preferable that the surface shape of the mold or the intermediate mold be made larger (wider and deeper) to compensate for shrinkage of the resin during curing. In this way, it is possible to correct for the change of size of the shape due to shrinkage of the resin.

When pressing the intermediate material or the material of the final article against the surface of the mold or the intermediate mold with a resin in between, where de-molding treatment has been performed, it is preferable to treat the surface using a primer such as a silane coupling agent so as to improve the adhesion between the resin and the surface of the intermediate material, or between the resin and the surface of the material of the final article. As a result, selective separation of the resin from the mold or the intermediate mold is possible in the separation step, and this greatly reduces the amount of the resin remaining on the mold or the intermediate mold during separation. Consequently, the property of shape transfer will be improved in the next step.

In addition, when pressing the intermediate material or the material of the final article against the surface of the mold or the intermediate mold with a resin in between, it is important to provide a gap (or a space) between the surface of the mold and surface of the intermediate material, or between the surface of the intermediate mold and surface of the material of the final article. This gap acts as a channel for the un-cured resin surrounding the cured resin to flow in when the cured resin shrinks during curing. As a method of forming this gap, it is preferable to form a number of projected portions on the mold or the intermediate mold around the object fine surface structure, and these projected portions form channels between the mold or the intermediate mold and the surface of the material to be bonded therewith to allow an amount of un-cured resin equivalent to the reduced volume of the cured resin due to shrinkage of the resin during curing to flow in from the surrounding area.

When transferring the surface shape transferred to the resin to the intermediate material or the material of the final article by means of dry etching, in order to precisely transfer the shape, it is preferable to change the selection ratio of etching the resin, the intermediate material, or the material of the final article continuously or stepwise. By adjusting the selection ratio, the shape on the resin can be transferred to the object material as desired.

Next, embodiments related to the second aspect of the present invention are described. Here, only the different aspects are described, and the same descriptions as the above embodiments are omitted.

When fabricating a preliminary surface structure in the present invention, it is not necessary to fabricate the preliminary surface structure as precise as a fine surface structure of a final article. For this reason, the preliminary surface structure can be fabricated in various ways, for example, by sandblasting, dry etching, wet etching, dicing, polishing, cutting, methods for forming thin films such as vacuum evaporation, sputtering, CVD (Chemical Vapor Deposition), sol-gel method, glass bonding, and others. Among these methods, sandblasting, and wet etching are described in detail below in examples of embodiments of the present invention.

In dry etching, a preliminary surface structure is formed on the surface of a substrate by lithography and dry etching. In dicing, or polishing, or cutting, the preliminary surface structure is mechanically formed on the surface of the substrate. In the method of film formation, a projected preliminary structure is formed on the substrate by placing a mask at a position away from the substrate. In the sol-gel method, a solution prepared by hydrolysis and polymerization using tetraalkylorthosilicate is applied to a preliminary surface structure pattern, and after the pattern is dried and the solute is removed, thermal treatment is performed and siloxane bond is established, thereby a silica glass preliminary surface structure is formed. In glass bonding, the surface of a glass substrate, on which a pattern is formed, is put together with the surface of an object substrate by a HF solution or water, and then the substrates are placed in vacuum; after that, the glass substrate and the object substrate are heated at a temperature of about 250 degrees C. for 10 minutes or longer to bond them, and then the bonded glass substrate is polished from the back side to expose the pattern, and this pattern forms the preliminary surface structure.

When transferring a surface shape on a resin to a material of a final article with a preliminary surface structure formed thereon, because of the preliminary surface structure on the material of the final article, the amount of the resin and object material to be etched is roughly equivalent to the difference between the size of elements of the object fine surface structure and the size of elements of the preliminary surface structure, and it is smaller than the height of the elements of the object fine surface structure, making etching time short.

FIRST EXAMPLE

FIG. 1 is a cross-sectional view of a diffractive element 2 fabricated by a method described in the first example.

The diffractive element 2 was made of synthetic silica and was about 10 mm in diameter. As shown in FIG. 1, a number of projected rings were formed concentrically on the surface of the diffractive element 2, and the cross sections of the rings are in shapes of saw-teeth. The total number of the rings is 965, the pitch is 150 µm at the innermost ring (also called "the first ring") and is 2 µm at the outermost ring (also called "the last ring"), and the height of the rings is about 1.5 µm.

The diffractive element 2 was fabricated following the procedure below.

(1) From the performance of an electron beam writing device and properties of a photo-conducting material to be used as a resist in this example, it was estimated that the maximum height of the resist was not more than 0.8 µm after writing by the electron beam and developing, hence, it was decided to fabricate a silicon mold by transferring an object surface shape onto a silicon substrate, and the surface shape of the mold had a height equal to the object height 1.5 µm multiplied by a factor of (0.6/1.5), in other words, to fabricate a mold scaled down by 0.4 relative to the object surface shape, that is, n=2.5. When transferring the object surface shape from a resist onto the silicon substrate, the selection ratio was set to be 1.1.

(2) After transferring the surface shape from the resist to the silicon substrate, the surface shape on the silicon substrate was transferred to a silica intermediate mold. In this step, the selection ratio was set to be 1.6, the height of the surface structure after the transfer was 0.6 µm×1.6=0.96 µm, and the transferred shape was inverted.

(3) The surface shape of the intermediate mold was further transferred to a material of the final article, for this example, silica. In this step, the selection ratio was set to be 1.6, the height of the surface structure after the transfer was 0.96 µm×1.6=1.53 µm, and the surface shape on the final article material was inverted again, resulting in a normal surface shape on the final article material.

Below, the method of fabricating the diffractive element 2 is described in detail with reference to FIGS. 2A through 2F and FIGS. 3A through 3E.

FIGS. 2A through 2F are cross-sectional views showing the steps of fabricating the diffractive element 2 in the first example.

Figure 2A:
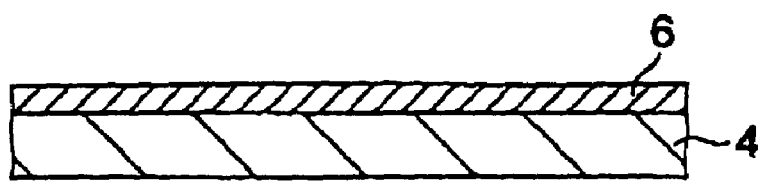
FIGS. 2A through 2F are cross-sectional views showing the steps of fabricating the diffractive element 2 in the first example.

As shown in FIG. 2A, as a base material 4 of a mold to be fabricated, a silicon substrate was prepared, which is 10.16 cm in diameter and 1.0 mm in thickness.

On the surface of the mold base material 4, a photo-conducting material 6, which acted as a resist in electron beam direct writing, was applied by using a spinner. During application of the photo-conducting material 6, the spinner first rotated at 500 rpm for 5 seconds, and then rotated at 2000 rpm for 30 seconds. The photo-conducting material 6 used here was the product OEBR-1000 of Tokyo Ohka Kogyo Co. Ltd.

Subsequently, the mold base material 4 with the photo-conducting material 6 applied thereon was pre-baked for 20 minutes at 170 degrees C. by an oven, and then was rapidly cooled. After the above treatment, the thickness of the photo-conducting material 6 (resist) was 1.0 µm.

Figure 2B:
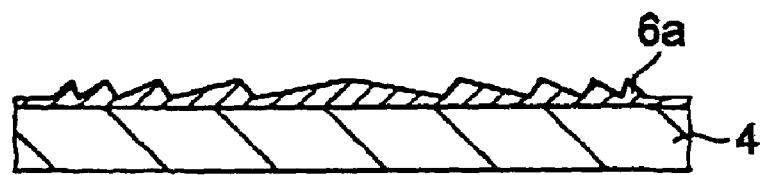

Next, as shown in FIG. 2B, in order to obtain the structure shown in FIG. 1, parameters for dividing the region to be written by an electron beam, path, diameter, and dose of the electron beam, and writing time were input to, for this example, a CAD system, separately. In this example, a circle is approximated by a 1080-sided polygon, and the total writing region is divided into small square regions each having an area of 500 µm×500 µm. The above conditions were written into a program.

Generally, there are two methods for writing a circular region. The first one is to divide the circular region and write the resulting small regions one by one; the second one is to write the circular region continuously. The former one is suitable if the lens used in electron beam writing is large; while if the lens is small, the latter one is suitable to complete electron beam writing continuously in one writing operation. In the present example, because the diameter of the lens is as large as 10 mm, the former method was employed.

The mold base material 4 with the photo-conducting material 6 applied thereon was set in an electron beam writing device, which was pumped down to a sufficiently high vacuum.

Next, the CAD data were sent to a controller of the electron beam writing device to start writing on the mold base material 4. In the present example, the mold base material 4 with the photo-conducting material 6 applied thereon was written on by the electron beam while being shifted in an X–Y stage, and the writing time was 30 hours.

Following the electron beam writing, a developing solution (for this example, OEBR-1000 developing solution) was used to develop the photo-conducting material 6 at 25 degrees C. for one minute, then, the developing solution was removed. Subsequently, the mold base material 4 and the resist 6 were dried by using a nitrogen blower and by rotating the spinner. As a result, the resist pattern 6a was formed.

Then, the resist pattern 6a was irradiated by ultraviolet light to harden the pattern 6a. This is the so-called UV hardening treatment. After the hardening treatment, the height of the resist pattern 6a was 0.6 µm.

Figure 2C:

Next, as shown in FIG. 2C, the surface shape of the resist pattern 6a after the electron beam writing was transferred to the mold base material 4 by dry etching. Specifically, a TCP (Transformer Coupled Plasma) etching device was used, and etching was performed for two minutes with a gas of $CHF_3$ and a gas of $CF_4$ being fed at flow rates of 15.0 sccm and 2 sccm, respectively. The power of the substrate bias was 500 W, the power of the upper electrode was 1250 W, the vacuum was $1.5 \times 10^{-3}$ Torr, and the etching speed was 0.4 µm/minute. Etching of the resist pattern 6a and the mold base material 4 was stopped when the mold base material 4 was slightly over-etched, forming a mold 4a. The selection ratio during this etching, that is, the ratio of the etching speed on the mold base material 4 (silicon) over the etching speed on the resist pattern 6a, was set to be 1.1, and the height of the surface shape on the mold 4a formed after etching was 0.66 µm. The roughness Ra of the surface shape of the mold 4a was 0.001 µm, and it was a sufficiently good value.

This height was specified by taking into consideration the fact that the resin for shape transfer in the next step shrinks by about 10%. Additionally, when writing using the electron beam, as shown in FIG. 2C, a projected pattern was formed on the silicon substrate 4 so as to form a channel for un-cured resin to flow in from the surrounding area when the shape transfer resin cured and shrank.

Comparing the surface shape of the mold 4a in FIG. 2C with the surface shape on the resist pattern 6a in FIG. 2B, the pitches of the shapes were the same, but the height of the surface shape of the mold 4a was 1.1 times that of the resist pattern 6a.

In order to perform a de-molding treatment on the surface of the mold 4a, a 50 nm Ni film was formed on the surface of the mold by sputtering at a vacuum of $7 \times 10^{-3}$ Torr. Since the pressure was relatively high, the film was uniformly formed on the surface of the mold 4a.

Next, the surface of the mold 4a with the Ni file formed thereon was treated by using a fluorinated triazinethiol organic compound. This treatment was performed by organic coating. In detail, the Ni surface was treated by electrolytic polymerization in a solution with a fluorinated SFTT (SuperFine TriazineThiol) solute dissolved in a solvent. Therefore, a fluorine-based organic thin film was formed on the mold surface.

The fluorinated SFTT is obtained by fluorinating a side chain of the triazinethiol, which is one of the organic sulfur compounds. Because the water shedding effect is strongest when the number n of the fluorine molecules is 7, a fluorinated SFTT film was formed to 100 nm under this condition. It should be noted that the water shedding effect as strong as above can also be obtained by using, for example, triazinethiol having a silanol radical, and others not containing nickel.

Figure 2D:
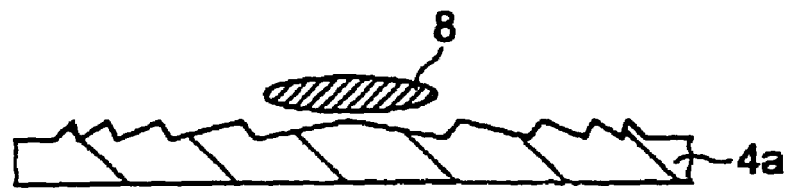

Next, as shown in FIG. 2D, a UV curable resin 8 was applied on the mold 4a after the de-molding treatment. For this example, the product GRANDIC RC-8720 of Dainippon Ink and Chemicals, Incorporated, was used as the UV curable resin 8, and the volume of the applied UV curable resin 8 was 3 cc.

Figure 2E:
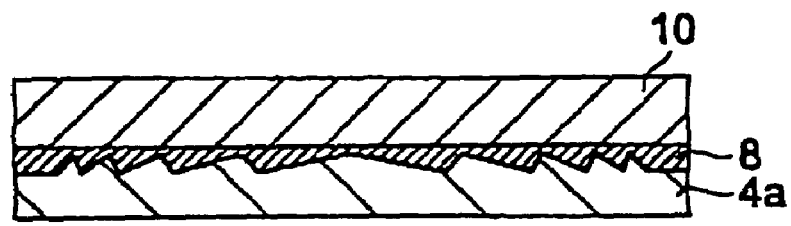

Next, as shown in FIG. 2E, the mold 4a was set into a bonding machine, whereby a plate substrate 10, acting as an intermediate material on which an intermediate mold would be fabricated, was pressed against the mold 4a slowly and was bonded with the mold 4a. The plate substrate 10 had been subjected to a silane coupling treatment in advance so as to improve the adhesion between the resin 8 and the surface of the intermediate material 10. In this example, the intermediate material 10 was synthetic silica manufactured by Shin-Etsu Quartz Products Co. Ltd. In order that bubbles were not generated in the UV curable resin 8, the speed of moving downward the intermediate material 10 was controlled by the bonding machine.

After that, the mold 4a was slowly pressed up against the intermediate material 10, and excessive UV curable resin 8 unnecessary in shape transfer was removed from the periphery of the mold 4a and the intermediate material 10.

Then, the upper side of the intermediate material 10 was uniformly irradiated by ultraviolet light in a dose of 3000 mJ to cure the UV curable resin 8. After the irradiation, the minimum thickness of the UV curable resin layer 8 (the minimum interval between the intermediate material 10 and the mold 4a) was less than 0.1 µm, and the maximum thickness of the UV curable resin 8 was equal to the sum of the pattern depth 0.66 µm of the surface shape on the mold 4a and the minimum interval 0.1 µm between the intermediate material 10 and the mold 4a, that is, 0.76 µm.

Figure 2F:
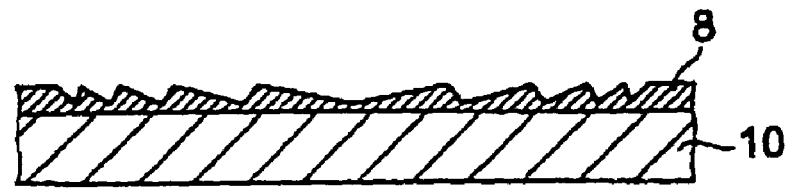

Next, as shown in FIG. 2F, in order to separate the UV curable resin 8 from the mold 4a while keeping the resin 8 being bonded with the intermediate material 10, jigs was used to deform the silicon substrate of the mold 4a, which had a low rigidity, to make the silicon substrate slightly convex, and this made it easy to strip the UV curable resin 8 bonded with the intermediate material 10 from the mold 4a.

Subsequently, the surface shape transferred to the resin layer 8 bonded with the intermediate material 10 was measured. It was found that the depths of the concave portions in the surface shape on the resin 8, as illustrated in FIG. 2F, reduced to 0.60 μm. This reduction was due to shrinkage of the resin 8 during curing, and the rate of shrinkage was about found to be 11% on average.

It is important to precisely measure the depth by an optical shape measurement device (that is, a non-contact measurement), and appropriately specify the selection ratios and other etching conditions by considering their variations with time in steps shown in FIGS. 3A through 3E.

FIGS. 3A through 3E are cross-sectional views showing the steps subsequent to the step in FIG. 2F for fabricating the diffractive element 2 in the first example.

Figure 3A:
FIGS. 3A through 3E are cross-sectional views showing the steps subsequent to the step in FIG. 2F for fabricating the diffractive element 2 in the first example.

As shown in FIG. 3A, in a similar way, the surface shape on the resin layer 8 bonded with the intermediate material 10 was transferred to the intermediate material 10 by dry etching, forming an intermediate mold 10a. Specifically, a TCP (Transformer Coupled Plasma) etching device was used, and etching was performed for five minutes with a gas of $CHF_3$ and a gas of $CF_4$ being fed at flow rates of 12.0 sccm and 4 sccm, respectively. The power of the substrate bias was 500 W, the power of the upper electrode was 1250 W, and the vacuum to be $1.5 \times 10^{-3}$ Torr. The etching speed was 0.25 μm/minute.

In the later half of the etching process, the flow rate of the $CHF_3$ gas was increased by 2.0 sccm to raise the selection ratio slightly. By changing the selection ratio gradually, transfer of the desired shape was achieved.

The selection ratio during the above etching, that is, the ratio of the etching speed on the intermediate material 10 (silica) over the etching speed on the resin layer 8, was set to be 1.75 on average, and the height of the surface shape of the intermediate mold 10a after etching was 1.05 μm. The roughness Ra of the surface of the intermediate mold 10a was 0.001 μm, and it was a sufficiently good value. In addition, the optical surface was a plane. Additionally, during shape transfer, as shown in FIG. 3A, projected spacers were formed on the intermediate mold 10a so as to secure the channel that allowed uncured resin flow in from the surrounding area in the next step of shape transfer.

Comparing the surface shape of the intermediate mold 10a with the surface shape of the mold 4a, the pitches in the surface shapes were the same, but the height of the surface shape of the intermediate mold 10a was 1.75 times that of the mold 4a.

Figure 3B:
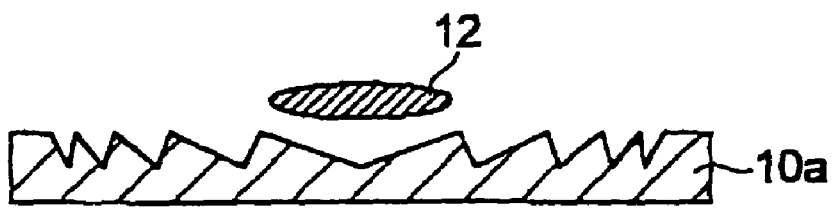

Next, as shown in FIG. 3B, in order to perform a de-molding treatment on the surface of the intermediate mold 10a, the surface of the intermediate mold 10a was treated by using a fluorinated triazinethiol organic compound. This treatment was performed by organic coating. In detail, the surface was treated by electrolytic polymerization in a solution with a solute, obtained by appending an OH radical to the end terminal of the fluorinated SFTT (Super-Fine TriazineThiol), dissolved in a solvent, and therefore, a fluorine-based organic thin film was formed on the surface of the intermediate mold 10a. The fluorine-based organic thin film was formed to 100 nm under this condition.

Next, a UV curable resin 12 was applied on the intermediate mold 10a after the de-molding treatment. For this example, the product GRANDIC RC-8720 of Dainippon Ink and Chemicals, Incorporated, was used as the UV curable resin 12, and the volume of the applied UV curable resin 12 was 3 cc.

Figure 3C:
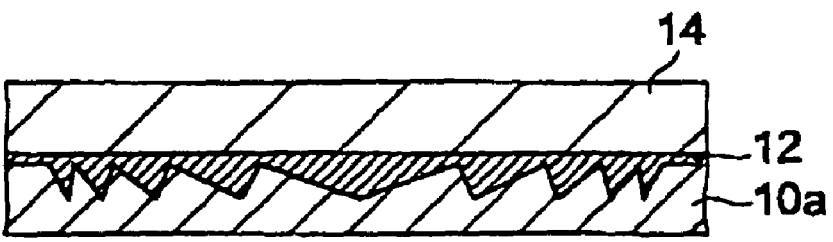

Next, as shown in FIG. 3C, the intermediate mold 10a was set into a bonding machine, whereby a plate substrate 14 was pressed against the intermediate mold 10a slowly and was bonded with the intermediate mold 10a. The plate substrate 14 was formed from silica, the material of the final article, and had been subjected to a silane coupling treatment in advance to improve the adhesion between the resin 12 and the surface of the final article material 14. In this example, the final article material 14 was made from synthetic silica manufactured by Shin-Etsu Quartz Products Co. Ltd. In order that bubbles were not generated in the UV curable resin 12, the speed of moving downward the final article material 14 was controlled by the bonding machine.

After that, the intermediate mold 10a was slowly pressed up against the final article material 14, and the excessive UV curable resin 12 unnecessary in shape transfer was removed from the periphery of the intermediate mold 10a and the final article material 14.

Then, the upper side of the final article material 14 was uniformly irradiated by ultraviolet light in a dose of 3000 mJ to cure the UV curable resin 12. After the irradiation, the minimum thickness of the UV curable resin layer 12 (the minimum interval between the final article material 14 and the intermediate mold 10a) was less than 0.1 μm, and the maximum thickness of the UV curable resin 12 was equal to the sum of the pattern depth 1.0 μm of the intermediate mold 10a and the minimum interval 0.1 μm between the final article material 14 and the intermediate mold 10a, that is, 1.1 μm.

Figure 3D:
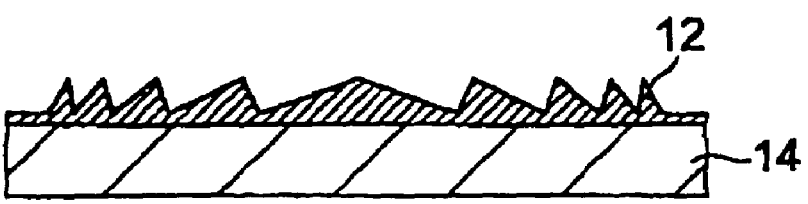

Next, as shown in FIG. 3D, jigs were used to separate the UV curable resin 12 from the intermediate mold 10a while keeping the resin 12 being bonded with the final article material 14.

Subsequently, the surface shape transferred to the resin layer 12 bonded with the final article material 14 was measured. It was found that the depths of the concave portions in the surface shape on the resin 12 reduced to 0.96 μm. This reduction was due to shrinkage of the resin layer 12 during curing, and the rate of shrinkage after curing was about 5% on average.

The rate of shrinkage after curing was about 11% on average in the step shown in FIG. 2F. The difference of the rate of shrinkage was because irradiation time of the ultraviolet light was longer in the step shown in FIG. 2F, and an amount of resin equivalent to the amount of shrinkage was supplemented from the surrounding area, and this reduced the rate of shrinkage of the resin during curing.

Figure 3E:

Next, as shown in FIG. 3E, in a similar way, the surface shape transferred to the resin layer 12 bonded with the final article material 14 was transferred to the final article material 14 by dry etching, and the final article 14a was obtained. Specifically, a TCP (Transformer Coupled Plasma) etching device was used, and etching was performed for seven minutes with a gas of $CHF_3$ and a gas of $CF_4$ being fed at flow rates of 12.0 sccm and 4 sccm, respectively. The power of the substrate bias was 500 W, and the power of the upper electrode was 1250 W, and the vacuum was $1.5 \times 10^{-3}$ Torr. The etching speed was 0.25 μm/minute.

In the later half of the etching process, the flow rate of the $CHF_3$ gas was increased by 2.0 sccm to raise the selection ratio slightly. By changing the selection ratio gradually, transfer of the desired shape was achieved.

The selection ratio during the above etching, that is, the ratio of the etching speed on the final article material 14 (silica) over the etching speed on the resin layer 12, was set to be 1.6 on average, and the height of the surface shape of the final article material 14 after etching was 1.53 μm. The roughness Ra of the surface of the final article 14a was 0.001 μm, and it was a sufficiently good value.

The final article 14a obtained in this way is the diffractive optical element 2 shown in FIG. 1.

SECOND EXAMPLE

An optical element used in optical communication, for example, for coupling two fibers, was fabricated by a method shown in the second example.

The optical element includes a number of lenses each having a diameter of 50 µm made of synthetic silica. The curvature radius of each lens was 6.16 µm, and the height of each lens was 28.0 µm.

This optical element was fabricated following the procedure below.

(1) It was decided to fabricate a silicon mold by transferring an object surface shape onto a silicon substrate, and the surface shape of the mold had a height equal to the object height 28.0 µm multiplied by a factor of (15.5/28.0), in other words, to fabricate a mold scaled down by 0.55 relative to the object surface shape, that is, n=1.82. When transferring the object surface shape from a resist onto the silicon substrate, the selection ratio was set to be 1.0.

(2) After transferring the surface shape from the resist to the silicon substrate, the shape on the silicon substrate was transferred to a silica intermediate material to obtain an intermediate mold. In this step, the selection ratio was set to be 1.4, the height of the surface structure after the transfer was 15.5 µm×1.4=21.7 µm, and the transferred shape was inverted.

(3) The surface shape of the intermediate mold was further transferred to a material of the final article, for this example, silica. In this step, the selection ratio was set to be 1.29, the height of the surface structure after the transfer was 21.7 µm×1.29=28.0 µm, and the surface shape on the final article material was inverted again, resulting in a normal surface shape on the final article material.

Below, the method of fabricating the optical element is described in detail with reference to FIGS. 4A through 4D and FIGS. 5A through 5D.

FIGS. 4A through 4D are cross-sectional views showing the steps of fabricating the optical element in the second example.

Figure 4A:
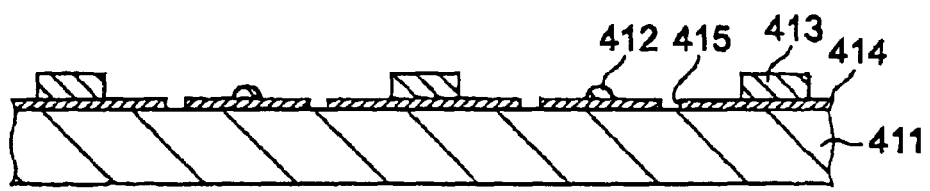
FIGS. 4A through 4D are cross-sectional views showing the steps of fabricating the optical element in the second example.

As shown in FIG. 4A, as a base material 411 of a mold to be fabricated, a silicon substrate was prepared, which is 15.24 cm in diameter and 0.625 mm in thickness. On the mold base material 411, a Cr film 414 was formed to 80 nm by sputtering. On the Cr film 414, a number of openings 415 were formed by removing the Cr film 414 at specified positions by lithography and etching along a circle surrounding the region where the object optical element was to be formed. For example, six openings 415 were formed along the circle.

These openings 415 correspond to spacers that form channels for un-cured resin to flow through in the step of shape transfer from an intermediate mold to the final article material. Specifically, the openings 415 correspond to projected portions 455 in the step shown in FIG. 5A, which act as spacers.

On the surface of the mold base material 411 with the Cr film 412 formed thereon, a not illustrated photo-conducting material, which acted as a resist in later lithography, was applied by using a spinner. Thickness of the photo-conducting material (resist) was 20.0 µm. The photo-conducting material used here was the product TGMR-950 of Tokyo Ohka Kogyo Co. Ltd. Subsequently, the mold base material 411 with the Cr film 412 and the photo-conducting material thereon was pre-baked at 100 degrees C. for 180 seconds.

Then, the substrate including the mold base material 411, the Cr film 412, and the photo-conducting material was exposed to light in a dose of 1800 mJ by using a stepper and a transmittance variable mask. The transmittance variable mask was designed beforehand, and it had the object surface shape having a height of 15.5 µm.

After that, the substrate was developed and cleaned, and after the UV hardening treatment, resist patterns 412 and 413 were formed, as shown in FIG. 4A. The resist patterns 413 acted as a spacer and formed a channel for a resin to flow through from the surrounding area in the step of shape transfer from silicon mold to the intermediate mold. The resist patterns 412 were used for the object optical element. The height of the resist pattern 412, which was reduced by a factor of 1/n, was 0.2 µm lower than the resist pattern 413.

Figure 4B:

Next, as shown in FIG. 4B, the shapes of the resist patterns 412 and 413, and the Cr film pattern 414 were transferred to the mold base material 411 by dry etching, forming a mold 411a. Specifically, a TCP etching device was used, and etching lasted for 21 minutes with a gas of $CHF_3$ and a gas of $CF_4$ being fed at flow rates of 5.0 sccm and 10.0 sccm, respectively. The power of the substrate bias was 500 W, the power of the upper electrode was 1250 W, and the vacuum was $1.5 \times 10^{-3}$ Torr. The etching speed was 0.8 µm/minute. Etching of the resist patterns 412 and 413 and the mold base material 411 was stopped when the mold base material 411 was slightly over-etched. The selection ratio during the above etching, that is, the ratio of the etching speed on the mold base material 411 (silicon) over the etching speed on the resist patterns 412 and 413, was set to be 1.0, and the height of the optical lens portion 422 was 15.5 µm. The roughness Ra of the surface of the optical lens portion 422 was 0.001 µm, and it was a sufficiently good value.

This height was specified without taking into consideration the effect of shrinkage of the resin in the next step. This was because a projected spacer 423 was formed in the region surrounding the optical lens portion 422 on the silicon mold 411a during lithography using a mask, as shown in FIG. 4B, and the spacer 423 formed the channel for resin to flow through in the next step, and it was not necessary to give a margin to the height of the optical lens portion 422.

In FIG. 4B, recesses 425 were formed on the silicon mold 411a, corresponding to openings 415 in the Cr film in the step shown in FIG. 4A.

Because bottoms of the recesses 425 were the lowest positions on the surface of the silicon mold 411a, and the selection ratio of the etching speed on the silicon mold 411a over the etching speed on the Cr film was greater than the selection ratio of the etching speed on the silicon mold 411a over the etching speed on the resist patterns 412 and 413, each of the recesses 425 was etched to a depth of 0.2 µm, which was three times the thickness of the Cr film.

After the above treatment, the surface shape of the optical lens portion 422 on the silicon mold 411a was the same as that of the resist pattern 412.

In order to perform a de-molding treatment on the surface of the silicon mold 411a, the surface of the silicon mold 411a was treated by using a fluorinated triazinethiol organic compound, specifically, a 100 nm film of the organic compound was formed on the surface of the silicon mold 411a.

Figure 4C:
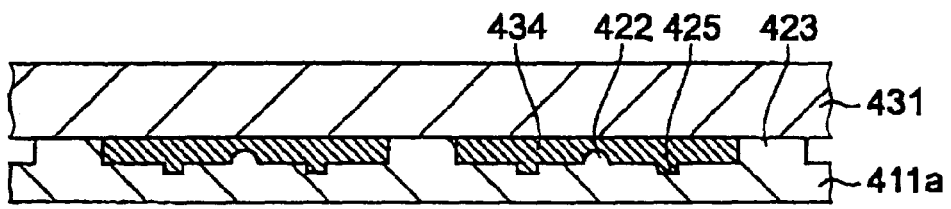

Next, as shown in FIG. 4C, the silicon mold 411a after the de-molding treatment was set with the surface having the optical lens portions 422 on the upper side, and a UV curable resin 434 was applied on the silicon mold 411a. For this example, an acrylic resin GRANDIC RC-8720 of Dainippon Ink and Chemicals, Incorporated, was used as the UV curable resin 434, and the volume of the applied UV curable resin 434 was 3 cc.

Then, the silicon mold 411a was set into a bonding machine, whereby a plate 431, acting as an intermediate material on which an intermediate mold would be fabricated, was pressed against the silicon mold 411a slowly and was bonded with the mold 411a. The plate 431 had been subjected to a silane coupling treatment in advance to improve the adhesion between the resin 434 and the surface of the intermediate material 431. In this example, the intermediate material 431 was made from NeoCeram (a registered trade mark) manufactured by Nippon Sheet Glass Co. Ltd. In order that bubbles were not generated in the UV curable resin 434, the speed of moving downward the intermediate material 431 was controlled by the bonding machine.

After that, the silicon mold 411a was slowly pressed up against the intermediate material 431, and the excessive UV curable resin 434 unnecessary in shape transfer was removed from the periphery of the silicon mold 411a and the intermediate material 431.

Then, the upper side of the intermediate material 431 was uniformly irradiated by ultraviolet light in a dose of 4000 mJ to cure the UV curable resin 434. Irradiation of the ultraviolet light was performed from the center portion of the optical element.

After the irradiation, although the resin 434 shrank in volume, because the intermediate material 431 was supported by the spacers 423 to prevent the intermediate material 431 from moving downward, resin in the surrounding area moved in to supply the deficit of the resin due to shrinkage of the resin. As a result, the reduction of the volume of the resin 464 did not cause change of the height of the resin 464.

After curing, the minimum thickness of the UV curable resin layer 434 (the minimum interval between the intermediate material 431 and the silicon mold 411a) was less than 0.1 µm, and the maximum thickness of the UV curable resin 434 was equal to the sum of the pattern depth 15.5 µm of the silicon mold 411a and the minimum interval 0.1 µm between the intermediate material 431 and the silicon mold 411a, that is, the maximum thickness of the UV curable resin 434 was 15.6 µm.

Figure 4D:
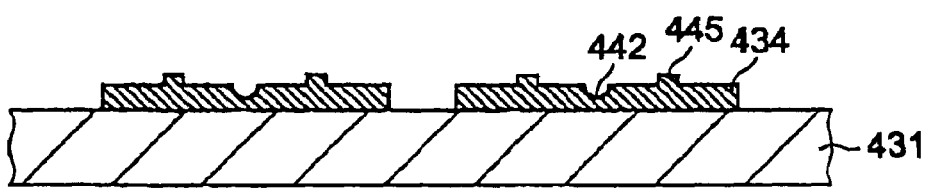

Next, as shown in FIG. 4D, in order to separate the UV curable resin 434 from the silicon mold 411a while keeping the resin 434 being bonded with the intermediate material 431, jigs was used to deform the silicon substrate 411 of the mold 411a, which had a low rigidity, to make silicon substrate 411 slightly convex, and this made it easy to strip the UV curable resin 434 bonded with the intermediate material 431 from the silicon mold 411a.

When the UV curable resin 434 was stripped from the silicon mold 411a, the inverted surface shape of the silicon mold 411a was transferred to resin 434, which remained on the intermediate material 431. The optical lens portion 422 on the silicon mold 411a became the concave portions 442, and the recesses 425 on the silicon mold 411a became the convex portions 445 acting as spacers.

Subsequently, the surface shape transferred to the resin layer 434 on the intermediate material 431 was measured. It was found that the depths of the concave portions in the surface shape of the optical element reduced to 15.5 µm. This reduction was due to shrinkage of the resin 434 during curing.

FIGS. 5A through 5D are cross-sectional views showing the steps subsequent to the step in FIG. 4D for fabricating the optical element in the second example.

Figure 5A:
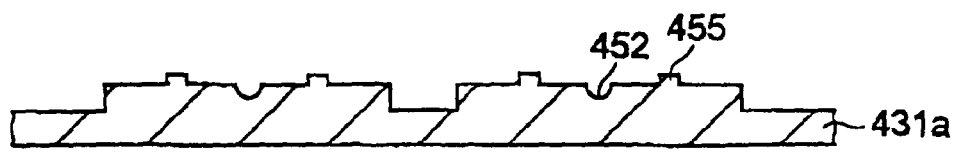
FIGS. 5A through 5D are cross-sectional views showing the steps subsequent to the step in FIG. 4D for fabricating the optical element in the second example.

As shown in FIG. 5A, in a similar way, the surface shape transferred to the resin layer 434 on the intermediate material 431 was transferred to the intermediate material 431 by dry etching, forming an intermediate mold 431a. Specifically, a TCP etching device was used, and etching was performed for 49.0 minutes with a gas of $CHF_3$, a gas of $CF_4$, and an Ar gas being fed at flow rates of 15.0 sccm, 15.0 sccm, and 10.0 sccm, respectively. The power of the substrate bias was 500 W, the power of the upper electrode was 1250 W, and the vacuum was $1.5 \times 10^{-3}$ Torr. The etching speed was 0.45 µm/minute.

In the later half of the etching process, the flow rate of the $CHF_3$ gas was increased by 4.0 sccm to raise the selection ratio slightly. By changing the selection ratio gradually, transfer of the desired shape was achieved. The selection ratio during the above etching was set to be 1.4 on average, and the height of the surface shape of the intermediate mold 431a after etching was 21.7 µm. The roughness Ra of the surface of the intermediate mold 431a was 0.001 µm, and it was a sufficiently good value. In addition, the optical surface is a plane.

In addition, as shown in FIG. 5A, concave portions 452 for forming lenses, and projected portions 455 for forming spacers were formed on the intermediate mold 431a, and the spacers 455 formed the channel for the resin to flow through in the next step of shape transfer.

Comparing the surface shape of the intermediate mold 431a with the surface shape of the silicon mold 411a, the pitches of them were the same, but the height of the surface shape of the intermediate mold 431a was 1.4 (21.7/15.5) times that of the silicon mold 411a.

Subsequently, in order to perform a de-molding treatment on the surface of the intermediate mold 431a, the surface of the intermediate mold 431a was treated by using a fluorinated triazinethiol organic compound. This treatment was performed by organic coating. In detail, the Ni surface was treated by electrolytic polymerization in a solution with a solute, obtained by appending an OH radical to the end terminal of the fluorinated SFTT (SuperFine TriazineThiol), dissolved in a solvent. Therefore, a fluorine-based organic thin film was formed on the surface of the intermediate mold 431a. The fluorine-based organic thin film was formed to 100 nm under this condition.

Since the main composition of the NeoCeram and the silica of the intermediate mold 431a was $SiO_2$, they were able to be treated by the same de-molding treatment.

Figure 5B:
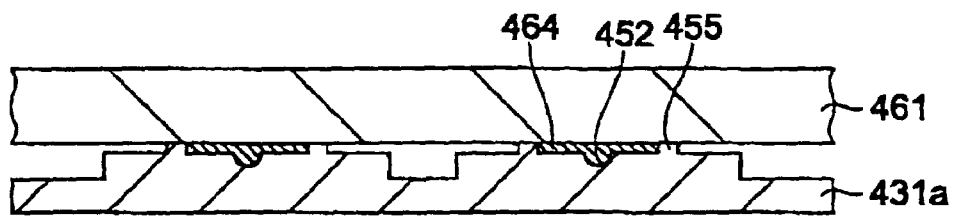

Next, as shown in FIG. 5B, the shaped surface of the intermediate mold 431a after the de-molding treatment was set on the upper side, and a UV curable resin 464 was applied on the intermediate mold 431a. For this example, an acrylic resin GRANDIC RC-8720 of Dainippon Ink and Chemicals, Incorporated, was used as the UV curable resin 464, and the volume of the applied UV curable resin 464 was 3 cc. A relatively larger amount of resin 464 was applied onto the lens portions 422.

The intermediate mold 431a was set into a bonding machine, whereby a plate substrate 461 was pressed against the intermediate mold 431a slowly and was bonded with the intermediate mold 431a. The plate substrate 461 was formed from silica, the material of the final article (the optical element), and had been subjected to a silane coupling treatment in advance to improve the adhesion between the resin 464 and the surface of the final article material 461. For this example, the final article material 461 was made from synthetic silica manufactured by Shin-Etsu Quartz Products Co. Ltd. In order that bubbles were not generated in the UV curable resin 464, the speed of moving downward the final article material 461 was controlled by the bonding machine. Therefore, the UV curable resin 464 was sandwiched by the intermediate mold 431a and the plate substrate 461.

After that, the intermediate mold 431a was slowly pressed up against the final article material (silica) 461, and the excessive UV curable resin 464 unnecessary in shape transfer was removed from the periphery of the intermediate mold 431a and the final article material 461.

Then, the upper side of the final article material 461 was uniformly irradiated by ultraviolet light in a dose of 3000 mJ to cure the UV curable resin 464. Irradiation of the ultraviolet light was performed from the center portion of the optical element.

After the irradiation, although the resin 464 shrank in volume, because the final article material 461 was supported by the spacers 455 to prevent the final article material 461 from moving downward, resin in the surrounding area moved in to supply the deficit of the resin due to shrinkage. Although it looks like that the spacers 455 seals the resin in FIG. 5B, because the spacers 455 were formed at discrete positions, resin was able to pass through the space between the spacers 455. As a result, the reduction of the volume of the resin 464 did not cause change of the height of the resin 464.

After curing, the minimum thickness of the UV curable resin layer 464 (the minimum interval between the final article material 461 and the intermediate mold 431a) was less than 0.1 μm, and the maximum thickness of the UV curable resin 464 was equal to the sum of the pattern depth 21.7 μm of the intermediate mold 431a and the minimum interval 0.1 μm, that is, 21.8 μm.

Figure 5C:

Next, as shown in FIG. 5C, a jig was used to separate the UV curable resin 464 from the intermediate mold 431a while keeping the resin 464 being bonded with the final article material 461.

Subsequently, the surface shape transferred to the resin layer 464 on the final article material 461 was measured. It was found that the depths of the convex portions (the optical element portions) reduced to 21.7 μm.

Figure 5D:

Next, as shown in FIG. 5D, in a similar way, the surface shape transferred to the resin layer 464 on the final article material 461 was transferred to the final article material 461 by dry etching, and the final article 461a (the optical element) was obtained. Specifically, a TCP etching device was used, and etching was performed for 37 minutes with a gas of $CHF_3$, a gas of $CF_4$, and an Ar gas being fed at flow rates of 10.0 sccm, 24.0 sccm, and 5.0 sccm, respectively. The power of the substrate bias was 500 W, the power of the upper electrode was 1250 W and the vacuum was $1.5 \times 10^{-3}$ Torr. The etching speed was 0.78 μm/minute.

In the later half of the etching process, the flow rate of the $CHF_3$ gas was increased by 3.0 sccm to raise the selection ratio slightly. By changing the selection ratio gradually, transfer of the desired shape was achieved.

The selection ratio during the above etching was set to be 1.3 on average, and the height of the surface shape of the optical lens portion 484 on the final article 461a after etching was 28.0 μm. The roughness Ra of the surface of the optical lens portion 484 was 0.001 μm, and it was a sufficiently good value.

THIRD EXAMPLE

Below, a third example of a method of fabricating an optical element the same as that illustrated in FIGS. 4A through 4D, and FIGS. 5A through 5D is described below. This optical element, for example, is used for coupling two fibers. In this example, a detailed configuration of the optical element is introduced, and it is represented by a reference number 100.

FIGS. 6A and 6B are a plan view and a cross-sectional view, respectively, showing a configuration of the optical element 100, where the cross-sectional view in FIG. 6B is obtained along the X—X line in FIG. 6A.

As shown in FIGS. 6A and 6B, the optical element 100 includes a large number of lenses 102 formed on two sides of a synthetic silica substrate 110. The lenses 102 are arranged in a matrix manner on each side of the silica substrate 110. Each of the lenses 102 is 0.784 mm in diameter ($\Phi_0$), and 40 μm in height ($H_0$).

As shown in FIG. 6A, the lenses 102 on the two sides of the silica substrate 110 in the optical element 100 form a micro-lens array 108.

FIGS. 7A and 7B are partial cross-sectional views showing the optical element 100 for coupling two fibers 104a and 104b.

In FIG. 7A, the optical element 100 is placed on the side of the fiber 104a so that the lens 102 receives and condenses the light from the fiber 104a.

In FIG. 7B, the optical element 100 is placed on the side of the fiber 104b so that the lens 102 condenses the light from the fiber 104a and guides the light to the fiber 104b. As shown in FIGS. 7A and 7B, silica plates 106a and 106b are disposed at the end of the fiber 104a and the end of the fiber 104b, respectively.

In this example, the optical element 100 was designed to have 210 lenses 102 (15×14) on each side of the silica substrate 110. As mentioned above, the diameter of each lens 102 is 0.784 mm, the height thereof is 40.0 μm, and the radius of curvature thereof is 1.8897 μm.

In the optical element 100 actually fabricated in the present example, the effective number of lenses 102 in the micro-lens array 108 is 12 (line)×13 (column)=156, the pitch (P) between lenses is 1.1 mm. The lenses 102 in the most peripheral region of the optical element 100 are not actually used, but arranged just for optical property adjustment.

Next, the procedure of actually fabricating the optical element 100 is described.

Figure 8A:
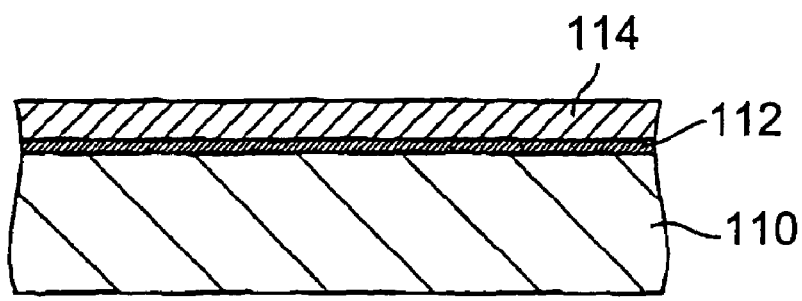
FIGS. 8A and 8B are cross-sectional views showing the steps of fabricating a resist pattern for forming a preliminary surface structure of the optical element 100 in the third example.
Figure 8B:
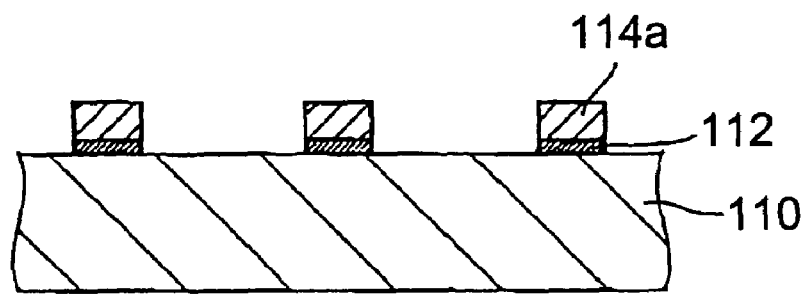

FIGS. 8A and 8B are cross-sectional views showing the steps of fabricating a resist pattern for forming a preliminary surface structure of the optical element 100.

Before fabricating the resist pattern, a mask used in lithography for shielding the lenses 102 was prepared. The diameter of each shielding portion of the mask was essentially the same as the object diameter of each of the lenses 102.

As shown in FIG. 8A, on the silica substrate 110, a Cr metal film 112 was formed by sputtering to a thickness of 200 nm. On the Cr metal film 112, a photo-conducting resist material 114 was applied uniformly to a thickness of 5 μm by using a spinning coater. The photo-conducting material 114 used here was the product OFPR-5000-500 of Tokyo Ohka Kogyo Co. Ltd. Subsequently, the silica substrate 110 with the photo-conducting material 114 thereon was pre-baked under a certain condition, for example, for 100 seconds at 130 degrees C. on a hot plate.

Next, as shown in FIG. 8B, after lithography using the mask prepared beforehand, and after developing and cleaning, the silica substrate 110 with the photo-conducting material 114 thereon was post-baked, for example, for 60 minutes at 150 degrees C. by using an oven, and a resist pattern 114a was obtained.

Following that, with the resist pattern 114a as a mask, the Cr metal film 112 was etched by wet etching to remove the Cr metal film 112 other than portions covered by the resist pattern 114a. After this treatment, the cross-section of the Cr metal film 112 was inclined because of undercut in the wet etching.

Figure 9A:
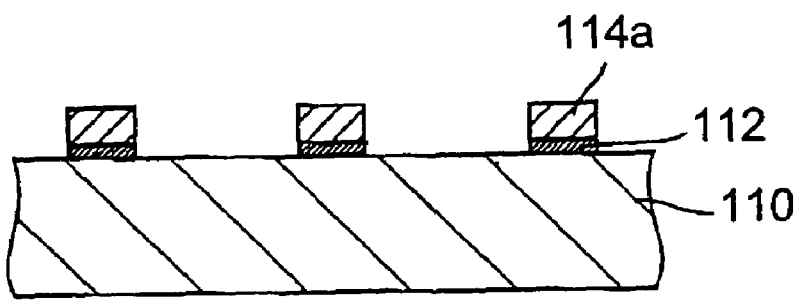
FIGS. 9A and 9B are cross-sectional views showing the steps of forming a preliminary surface structure of the optical element 100 by sandblasting in the third example.
Figure 9B:
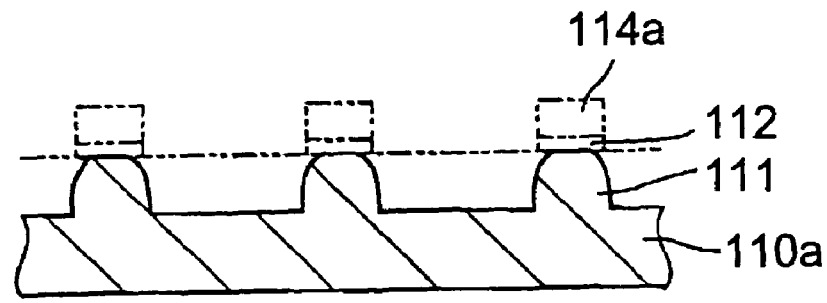

FIGS. 9A and 9B are cross-sectional views showing the steps of forming a preliminary surface structure of the optical element 100 by sandblasting.

In the step shown in FIG. 9A, with a commercial sandblasting apparatus, sand-size blasting grains were sprayed downward in the perpendicular direction driven by air pressure onto the surface of the silica substrate 110 with the Cr metal film 112 and the resist pattern 114a formed thereon.

Next, in the step shown in FIG. 9B, the silica substrate 110 was physically scraped by the blasting grains.

In sandblasting, the blasting grains sprayed downward perpendicularly collide with other blasting grains that hit the silica substrate 110 and move upward and scrape off silica grains. Because of this, as the silica substrate 110 was dug deeper and deeper by the blasting grains, the end of the projected portion 111 became smaller and smaller.

Further, materials of the resist 114a and the Cr metal film 112 on the substrate 110 were also scraped off by the blasting grains.

Because the cross-section of the Cr metal film 112 was inclined due to undercut in wet etching, the Cr metal film 112 was also scraped by sandblasting in an inclined direction, forming inclined surfaces extended in the course of sandblasting.

By this sandblasting, a preliminary surface structure substrate 110a was formed, which includes an array of projected nearly spherical portions 111. For each projected portion 111, the height was 40 μm, the diameter of the flat upper end was 0.2 mm, and the diameter of the base was 0.76 mm. Each projected portion 111 had a reduced size compared with the diameter $\Phi_0$ and height $H_0$ of the object lens.

Because the surface of the preliminary surface structure 110a processed by sand blasting was rough, the preliminary surface structure 110a could not be used directly in optical applications.

To fabricate the final article, namely, the optical element 100, a mold is needed to transfer a desired surface shape to the final article material. In this example, a concave mold was used to because the preliminary surface structure 110a was formed on the surface of final article material.

Figure 10A:
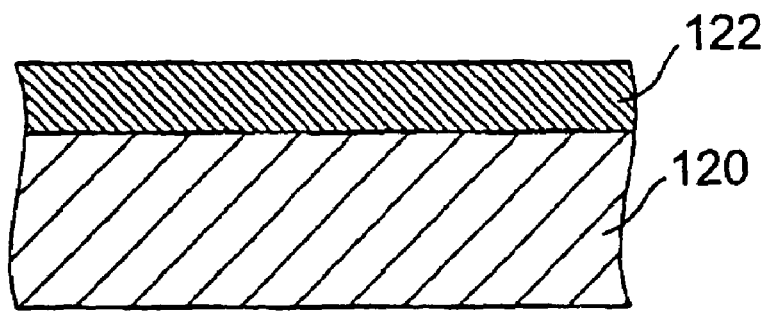
FIGS. 10A through 10C are cross-sectional views showing the steps of fabricating a mold by a method of the third example.
Figure 10B:
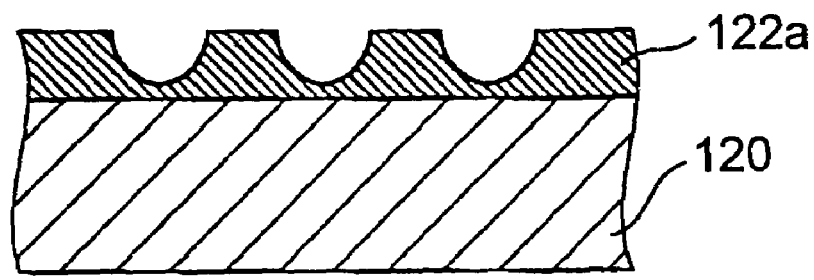
Figure 10C:
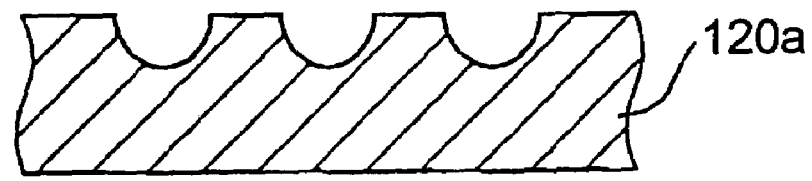

FIGS. 10A through 10C are cross-sectional views showing the steps of fabricating a mold by the method of the present invention.

In this example, the concave mold was fabricated from NeoCeram. The procedure of fabricating the mold is explained below.

It was decided to fabricate a silicon mold to transfer the desired surface shape onto the final article material. This mold was fabricated by transferring an object surface shape onto a silicon substrate, and the surface shape of the mold had a height equal to the object height 40.0 μm multiplied by a factor of (20.5/40.0), in other words, to fabricate a mold scaled down by 0.5125 relative to the object surface shape, that is, n=1.951.

A silicon substrate 120 was prepared to be used as a base material 120 of the mold to be fabricated, which is 15.24 cm in diameter and 0.625 mm in thickness.

In the step shown in FIG. 10A, on the mold base material 120, a photo-conducting resist material 122 was applied by using a spinner at a revolving rate of 1000 rpm. Thickness of the photo-conducting material (resist) was 25.0 μm. The photo-conducting material 112 used here was the product TGMR-950 of Tokyo Ohka Kogyo Co. Ltd. Subsequently, the mold base material 120 with the photo-conducting material 122 thereon was pre-baked at 100 degrees C. for 180 seconds on a hot plate.

In the step shown in FIG. 10B, then, the substrate including the mold base material 120 and the photo-conducting material (resist) 122 was exposed to light in a dose of 2000 mJ by using a stepper and a transmittance variable mask to form a concave resist pattern 122a on the photo-conducting material 122. The transmittance variable mask was designed beforehand, and it had the object surface shape having a height of 20.5 μm.

In the step shown in FIG. 10C, the resist pattern on the resist 122s was transferred onto the silicon substrate 120 by dry-etching, forming a mold 120a.

When transferring the object surface shape from the resist 122 onto the silicon substrate 120, the selection ratio was set to be 1.2, and after transferring the object surface shape onto the silicon substrate, the height of the surface shape on the silicon substrate 120 was 24.6 μm.

The optical element 100 was fabricated following the procedure below.

(1) The silicon mold 120a was fabricated as described above.

(2) After transferring the surface shape from the resist 122a to the silicon substrate 120a, the surface shape of the silicon substrate 120a was transferred to a NeoCeram intermediate material to obtain a concave intermediate mold. In this step, the selection ratio in dry etching was set to be 1.4. Here, because the rate of shrinkage of the resin used in this step was 4%, after transferring the surface shape of the silicon mold to the resin, the height of the surface shape after curing was 24.6 μm×0.96=23.6 μm. Since the surface shape was transferred to the NeoCeram intermediate material with a selection ratio of 1.4, the height of the surface structure after transfer to the NeoCeram intermediate material was 23.6 μm×1.4=33.0 μm. The transferred shape was inverted, that is, it was concave.

(3) The surface shape of the intermediate mold was further transferred to a material of the final article, for this example, silica. In this step, the selection ratio was set to be 1.29. Here, because the rate of shrinkage of a resin used in this step was 4%, after transfer from the intermediate mold to the resin, the height of the transferred surface shape was 33.0 μm×0.96=31.7 μm. Since the surface shape was transferred to the final article material with a selection ratio of 1.29, the height of the surface structure of the final article was 31.7 μm×1.29=40.9 μm, close to the object value. The surface shape on the final article material was a normal convex shape.

Below, the method of fabricating the optical element 100 is described in detail with reference to FIGS. 11A through 11D and FIGS. 12A through 12D.

For simplicity of explanation, fabrication of only two independent lenses 102 is illustrated in FIGS. 11A through 11D and FIGS. 12A through 12D, but the procedure of fabricating 156 lenses 102 is the same.

Figure 11A:
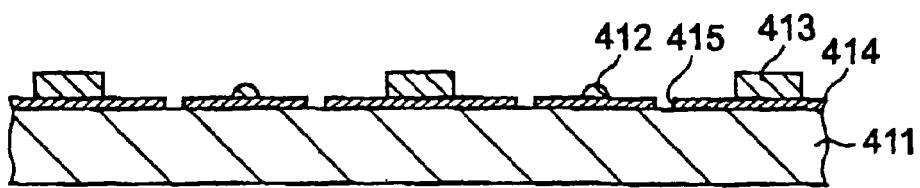
FIGS. 11A through 11D are cross-sectional views showing the steps of fabricating the optical element 100 in the third example.
Figure 11B:
Figure 11C:
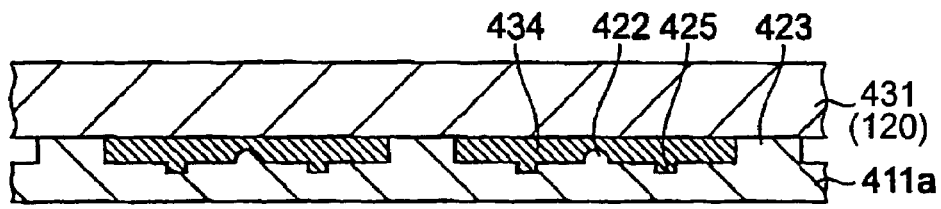
Figure 11D:
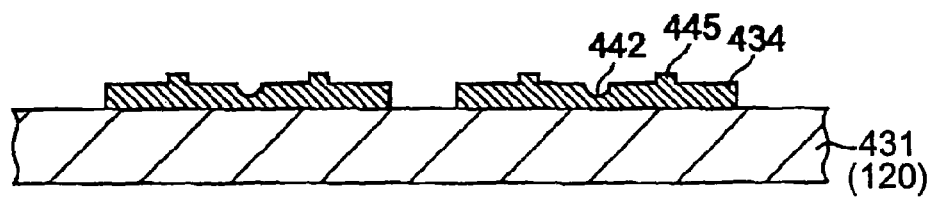
Figure 12A:
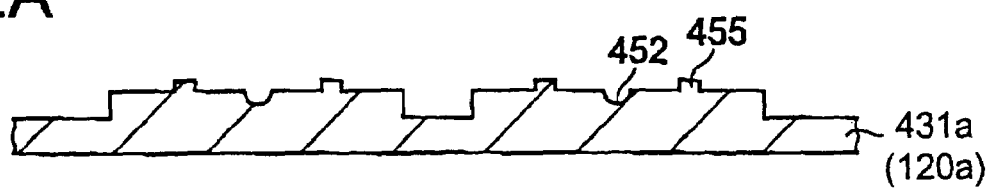
FIGS. 12A through 12D are cross-sectional views showing the steps subsequent to the step in FIG. 11D for fabricating the optical element 100 in the third example.
Figure 12B:
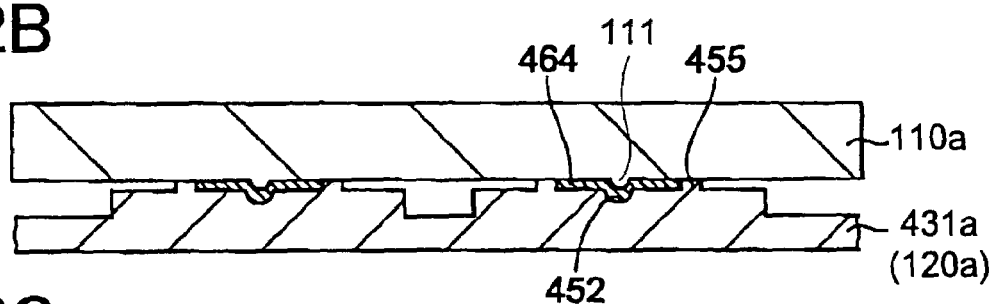
Figure 12C:
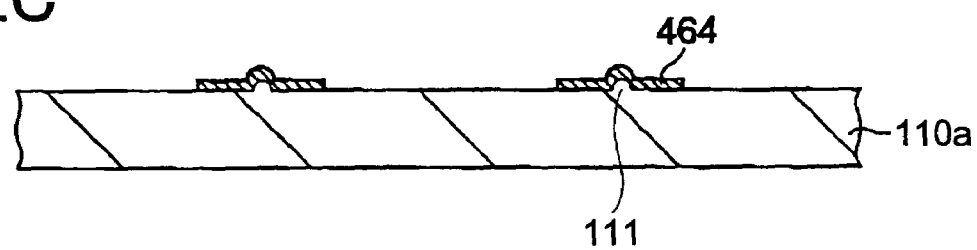

It is apparent that the portion of the optical element 100 shown FIGS. 11A through 11D and FIGS. 12A through 12D is almost the same as that shown in FIGS. 4A through 4D and FIGS. 5A through 5D, except that the final article material 110a in FIGS. 12B and 12C has a preliminary surface structure 111 formed beforehand as shown in FIG. 9B.

In the following description, the same reference numerals are used for the same components as those in FIGS. 4A through 4D and FIGS. 5A through 5D, except for the final article material 110a.

It should be noted that the fabricating conditions and film thickness were different in the second example and the third example.

Figure 12D:

Further, the intermediate mold 431a in FIGS. 5A and 5B and FIGS. 12A and 5B corresponds to the concave mold 120a in FIGS. 10C, the intermediate material 431 in FIGS. 4C and 4D and FIGS. 11C and 11D corresponds to the mold material 120 in FIGS. 10A and 10B, and the optical element 461a in FIG. 5D corresponds to the optical element 100 in FIG. 12D.

FIGS. 11A through 11D are cross-sectional views showing the steps of fabricating the optical element 100 in the third example.

As shown in FIG. 11A, as a base material 411 of a mold to be fabricated, a silicon substrate was prepared, which is 15.24 cm in diameter and 0.625 mm in thickness. On the mold base material 411, a Cr film 414 was formed to 80 nm by sputtering. On the Cr film 414, a number of openings 415 are formed by removing the Cr film 414 at specified positions by lithography and etching along a circle surrounding the region where the object optical lenses 102 were to be formed. For example, six openings 415 were formed along the circle.

These openings 415 correspond to spacers that form channels for uncured resin to flow through in the step of shape transfer from an intermediate mold to a final article material. Specifically, the openings 415 correspond to projected portions 455 acting as spacers in the step shown in FIG. 12A.

On the surface of the mold base material 411 with the Cr film 412 formed thereon, a not illustrated photo-conducting material, which acted as a resist in later lithography was applied by using a spinner. Thickness of the photo-conducting material (resist) was 25.0 μm. The photo-conducting material used here was the product TGMR-950 of Tokyo Ohka Kogyo Co. Ltd. Subsequently, the mold base material 411 with the Cr film 412 and the photo-conducting material thereon was pre-baked at 100 degrees C. for 180 seconds.

Then, the substrate including the mold base material 411, the Cr film 412, and the photo-conducting material was exposed to light in a dose of 2000 mJ by using a stepper and a transmittance variable mask. The transmittance variable mask was designed beforehand, and it had the object surface shape having a height of 20.5 μm.

After that, the substrate was developed and cleaned, and after the UV hardening treatment, resist patterns 412 and 413 were formed, as shown in FIG. 11A. The resist patterns 413 acted as spacers for forming channels for a resin to flow through from the surrounding area in the step of shape transfer from silicon mold to the intermediate mold. The resist patterns 412 were used for the object optical element. The height of the resist pattern 412, which was reduced by a factor of 1/n, was 0.2 μm lower than the resist pattern 413.

Next, as shown in FIG. 11B, the shapes of the resist patterns 412 and 413, and the Cr film pattern 414 were transferred to the mold base material 411 by dry etching. Specifically, a TCP etching device was used, and etching lasted for 21 minutes with a gas of $CHF_3$ and a gas of $CF_4$ being fed at flow rates of 5.0 sccm and 10.0 sccm, respectively. The power of the substrate bias was 500 W, the power of the upper electrode was 1250 W, and the vacuum was $1.5 \times 10^{-3}$ Torr. The etching speed was 0.8 μm/minute. Etching of the resist patterns 412 and 413 and the mold base material 411 was stopped when the mold base material 411 was slightly over-etched. The selection ratio during the above etching, that is, the ratio of the etching speed on the mold base material 411 (silicon) over the etching speed on the resist patterns 412 and 413, was set to be 1.4, and the height of the optical lens portion 422 was 20.5 μm×1.4=28.7 μm. The roughness Ra of the surface of the optical lens portion 422 was 0.001 μm, and it was a sufficiently good value.

This height was specified without taking into consideration the effect of shrinkage of the resin in the next step. This was because a projected spacer 423 was formed in the region surrounding the optical lens portion 422 on the silicon mold 411a during lithography using a mask, as shown in FIG. 11B, and the spacer 423 formed the channel for resin to flow through in the next step, and it was not necessary to give a margin to the height of the optical lens portion 422.

In FIG. 11B, recesses 425 were formed on the silicon mold 411a, corresponding to openings 415 in the Cr film in the step shown in FIG. 11A.

Because bottoms of the recesses 425 were the lowest positions on the surface of the silicon mold 411a, and the selection ratio of the etching speed on the silicon mold 411a over the etching speed on the Cr film was greater than the selection ratio of the etching speed on the silicon mold 411a over the etching speed on the resist patterns 412 and 413, each of the recesses 425 was etched to a depth of 0.2 μm, which was three times the thickness of the Cr film.

After the above treatment, the surface shape of the optical lens portion 422 on the silicon mold 411a was the same as that of the resist pattern 412.

In order to perform a de-molding treatment on the surface of the silicon mold 411a, the surface of the silicon mold 411a was treated by using a fluorinated triazinethiol organic compound, specifically, a 100 nm film of the organic compound was formed on the surface of the silicon mold 411a.

Next, as shown in FIG. 11C, the silicon mold 411a after the de-molding treatment was set with the surface having the optical lens portions 422 on the upper side, and a UV curable resin 434 was applied on the silicon mold 411a. For this example, an acrylic resin GRANDIC RC-8720 of Dainippon Ink and Chemicals, Incorporated, was used as the UV curable resin 434, and the volume of the applied UV curable resin 434 was 3 cc.

Then, the silicon mold 411a was set into a bonding machine, whereby a plate 431, acting as an intermediate material on which an intermediate mold would be fabricated, was pressed against the silicon mold 411a slowly and was bonded with the silicon mold 411a. The plate 431 had been subjected to a silane coupling treatment in advance to improve the adhesion between the resin 434 and the surface of the intermediate material 431. In this example, the intermediate material 431 was made from NeoCeram (a registered trade mark) manufactured by Nippon Sheet Glass Co. Ltd. In order that bubbles were not generated in the UV curable resin 434, the speed of moving downward the intermediate material 431 was controlled by the bonding machine.

After that, the silicon mold 411a was slowly pressed up against the intermediate material 431, and the excessive UV curable resin 434 unnecessary in shape transfer was removed from the periphery of the silicon mold 411a and the intermediate material 431.

Then, the upper side of the intermediate material 431 was uniformly irradiated by ultraviolet light in a dose of 4000 mJ to cure the UV curable resin 434. Irradiation of the ultraviolet light was performed from the center portion of the optical element.

After the irradiation, although the resin 434 shrank in volume, because the intermediate material 431 was supported by the spacers 423 to prevent the intermediate material 431 from moving downward, resin in the surrounding area moved in to supply the deficit of the resin due to shrinkage of the resin. As a result, the reduction of the volume of the resin 464 did not cause change of the height of the resin 464.

After curing, the minimum thickness of the UV curable resin layer 434 (the minimum interval between the intermediate material 431 and the silicon mold 411a) was less than 0.1 µm, and the maximum thickness of the UV curable resin 434 was equal to the sum of the pattern depth 28.7 µm of the silicon mold 411a and the minimum interval 0.1 µm between the intermediate material 431 and the silicon mold 411a, that is, the maximum thickness of the UV curable resin 434 was 28.8 µm.

Next, as shown in FIG. 11D, in order to separate the UV curable resin 434 from the silicon mold 411a while keeping the resin 434 being bonded with the intermediate material 431, jigs were used to deform the silicon substrate 411 of the mold 411a, which had a low rigidity, to make silicon substrate 411 slightly convex, and this made it easy to strip the UV curable resin 434 bonded with the intermediate material 431 from the silicon mold 411a.

When the UV curable resin 434 was stripped from the silicon mold 411a, the inverted surface shape of the silicon mold 411a was transferred to resin 434 remaining on the intermediate material 431. The optical lens portion 422 on the silicon mold 411a became the concave portions 442, and the recesses 425 on the silicon mold 411a became the convex portions 445 acting as spacers.

Subsequently, the surface shape transferred to the resin layer 434 on the intermediate material 431 was measured. It was found that the depths of the concave portions of the optical element were reduced to 27.6 µm. This reduction was due to shrinkage of the resin 434 during curing. Since the rate of shrinkage of the resin is 4%, 28.7 µm×0.96=27.6 µm.

FIGS. 12A through 12D are cross-sectional views showing the steps subsequent to the step in FIG. 11D for fabricating the optical element 100 in the present example.

As shown in FIG. 12A, in a similar way, the surface shape transferred to the resin layer 434 on the intermediate material 431 was transferred to the intermediate material 431 by dry etching, forming an intermediate mold 431a. Specifically, a TCP etching device was used, and etching was performed for 51.0 minutes with a gas of $CHF_3$, a gas of $CF_4$, and an Ar gas being fed at flow rates of 15.0 sccm, 15.0 sccm, and 10.0 sccm, respectively. The power of the substrate bias was 500 W, the power of the upper electrode was 1250 W, and the vacuum was $1.5 \times 10^{-3}$ Torr. The etching speed was 0.80 µm/minute.

In the later half of the etching process, the flow rate of the $CHF_3$ gas was increased by 4.0 sccm to raise the selection ratio slightly. By changing the selection ratio gradually, transfer of the desired shape was achieved. The selection ratio during the above etching was 1.5 on average, and the height of the surface shape of the intermediate mold 431a after etching was 40.0 µm. The roughness Ra of the surface of the intermediate mold 431a was 0.001 µm, and it was a sufficiently good value. In addition, the optical surface was a plane.

In addition, as shown in FIG. 12A, concave portions 452 for forming lenses, and projected portions 455 for forming spacers were formed on the intermediate mold 431a, and the spacers 455 formed the channel for the resin to flow through in the next step of shape transfer.

Comparing the surface shape of the intermediate mold 431a with the surface shape of the silicon mold 411a, the pitches of them were the same, but the height of the surface shape of the intermediate mold 431a was 1.95 (40.0/20.5) times that of the silicon mold 411a.

Subsequently, in order to perform a de-molding treatment on the surface of the intermediate mold 431a, the surface of the intermediate mold 431a was treated by using a fluorinated triazinethiol organic compound. This treatment was performed by organic coating. In detail, the Ni surface was treated by electrolytic polymerization in a solution with a solute, obtained by appending an OH radical to the end terminal of the fluorinated SFTT (SuperFine TriazineThiol), dissolved in a solvent, and therefore, a fluorine-based organic thin film was formed on the surface of the intermediate mold 431a. The fluorine-based organic thin film was formed to 100 nm under this condition.

Since the main composition of the NeoCeram and the silica of the intermediate mold 431a was $SiO_2$, they were able to be treated by the same de-molding treatment.

Next, as shown in FIG. 12B, the shaped surface of the intermediate mold 431a after the de-molding treatment was set on the upper side, and a UV curable resin 464 was applied on the intermediate mold 431a. For this example, an acrylic resin GRANDIC RC-8720 of Dainippon Ink and Chemicals, Incorporated, was used as the UV curable resin 464, and the volume of the applied UV curable resin 464 was 3 cc. Relatively more resin 464 was applied onto the lens portions 452.

The intermediate mold 431a was set into a bonding machine, whereby the plate substrate 110a was pressed against the intermediate mold 431a slowly and was bonded with the intermediate mold 431a. As shown in FIGS. 9A and 9B, the plate substrate 110a was formed from silica, the material of the final article (the optical element), and a preliminary surface structure 111 had been formed on the plate substrate 110a in advance. Furthermore, the plate substrate 110a had been subjected to a silane coupling treatment in advance to improve the adhesion between the resin 464 and the surface of the final article material 110a. For this example, the final article material 110a was made from synthetic silica manufactured by Shin-Etsu Quartz Products Co. Ltd. In order that bubbles were not generated in the UV curable resin 464, the speed of moving downward the final article material 110a was controlled by the bonding machine. Therefore, the UV curable resin 464 was sandwiched by the intermediate mold 431a and the plate substrate 110a.

After that, the intermediate mold 431a was slowly pressed up against the final article material (silica) 110a, and the excessive UV curable resin 464 unnecessary in shape transfer was removed from the periphery of the intermediate mold 431a and the final article material 110a.

Then, the upper side of the final article material 110a was uniformly irradiated by ultraviolet light in a dose of 3000 mJ to cure the UV curable resin 464. Irradiation of the ultraviolet light was performed from the center portion of the optical element.

After the irradiation, although the resin 464 shrank in volume, because the final article material 110a was supported by the spacers 455 to prevent the final article material 110a from moving downward, resin in the surrounding area moved in to supply the deficit of the resin due to shrinkage. Although it looks like the spacers 455 sealed the resin in FIG. 12B, because the spacers 455 were formed at discrete positions, resin was able to pass through the space between the spacers 455. As a result, the reduction of the volume of the resin 464 did not cause change of the height of the resin 464.

After curing, in regions not including the preliminary surface structure 111, the minimum thickness of the UV curable resin layer 464 (the minimum interval between the intermediate mold 431a and the final article material 110a) was less than 0.1 µm, and the maximum thickness of the UV curable resin 464 was equal to the sum of the pattern depth 38.4 µm of the intermediate mold 431a and the minimum interval 0.1 µm, that is, 38.5 µm.

Next, as shown in FIG. 12C, a jig was used to separate the UV curable resin 464 from the intermediate mold 431a while keeping the resin 464 being bonded with the final article material 110a.

Subsequently, the surface shape transferred to the resin layer 464 on the final article material 110a was measured. It was found that the depths of the convex portions corresponding to elements of the preliminary surface structure 111 (the optical element portions) reduced to 9.8 µm. This small thickness of the resin 464 was due to the presence of the preliminary surface structure 111. In other words, because the preliminary surface structure 111 was formed on the final article material in advance, the resin covering elements of the preliminary surface structure 111 became very thin, and this reduced the amount of etching in the next step.

Next, as shown in FIG. 12D, in a similar way, the surface shape transferred to the resin layer 464 on the final article material 110a was transferred to the final article material 110a by dry etching, and the final article 461a (the optical element) was obtained. Specifically, a TCP etching device was used, and etching was performed for 13.5 minutes with a gas of $CHF_3$, a gas of $CF_4$, and an Ar gas being fed at flow rates of 10.0 sccm, 24.0 sccm, and 5.0 sccm, respectively. The power of the substrate bias was 500 W, the power of the upper electrode was 1250 W and the vacuum was $1.5 \times 10^{-3}$ Torr. The etching speed was 0.78 µm/minute.

As mentioned above, because the preliminary surface structure 111 was formed on the final article material 110a in advance, the thickness of the resin 464 was greatly reduced, and this greatly reduced etching time in dry-etching.

In the later half of the etching process, using an auto pressure controller (APC), the vacuum was increased continuously from 3 mTorr to 1.0 mTorr, and this lowered the gas pressure continuously and raised the selection ratio four times as time elapsed. By changing the selection ratio gradually, transfer of the desired shape was achieved.

The selection ratio during the above etching was 1.04 on average, and the height of the surface shape of the optical lens portion 484 on the final article 461a after etching was 40.0 µm. The roughness Ra of the surface of the optical lens portion 484 was 0.001 µm, and it was a sufficiently good value.

In this way, lenses 102 were formed on one side of the silica substrate 110, as shown in FIGS. 6A and 6B, or in FIGS. 7A and 7B.

The lenses 102 on the other side of the silica substrate 110a were formed in the same way, with the lenses 102 on one side being protected by jigs or masks. The positioning of the lenses on the two sides was achieved by positioning marks provided beforehand.

FOURTH EXAMPLE

A fourth example of a method of fabricating an optical element the same as that illustrated in FIGS. 6A and 6B, or in FIGS. 7A and 7B is described below. The optical element for this example is used for coupling two fibers.

Figure 13A:
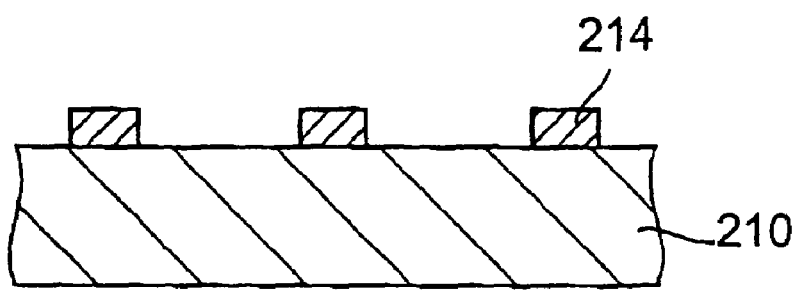
FIGS. 13A and 13B are cross-sectional views showing the steps of forming a preliminary surface structure of the optical element 100 in the fourth example.
Figure 13B:
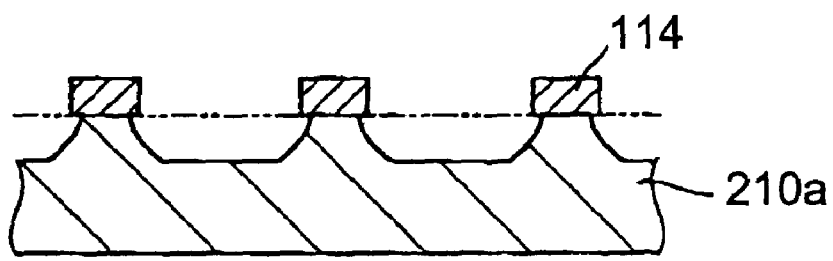

In this example, a preliminary surface structure was fabricated following the steps shown in FIGS. 13A and 13B.

FIGS. 13A and 13B are cross-sectional views showing the steps of forming a preliminary surface structure of the optical element 100 using a method of the fourth example.

First, a mask used in lithography for shielding the lenses 102 was prepared. The diameter of each shielding portion of the mask was essentially the same as the object diameter of each of the lenses 102.

In the step shown in FIG. 13A, on a silica substrate 210, a photo-conducting material 214 was applied uniformly to a thickness of 5 µm by using a spinning coater. The photo-conducting material 214 used here was the product OFPR-5000-500 of Tokyo Ohka Kogyo Co. Ltd. Subsequently, the silica substrate 210 with the photo-conducting material 214 thereon was pre-baked under a certain condition, for this example, for 100 seconds at 130 degrees C. on a hot plate.

After lithography using the mask prepared beforehand, and after developing and cleaning, the silica substrate 210 with the photo-conducting material 214 thereon was post-baked, for this example, for 60 minutes at 150 degrees C. by using an oven.

Following that, the silica substrate 210 was fixed by a jig for etching by an etching device and for protecting the back surface of the silicon substrate 210.

Next, in the step shown in FIG. 13B, with a wet etching device and an etching solution (for this example, HF), the silica substrate 210 was etched by wet etching to partially remove the silica substrate 210 not covered by the resist 214.

In the wet etching device, the silica substrate 210 was rotated by a rotating mechanism during etching. In addition, the etching solution was maintained to be at a constant concentration, and was sprayed at a sufficiently high flow rate from a nozzle.

After etching, a preliminary surface structure substrate 210a was formed. In the cross-section of the etched portion of the preliminary surface structure substrate 210a, as shown in FIG. 13B, there are inclined surfaces caused by undercut in the wet etching, and flat bottom surfaces because of sufficient agitation.

By this treatment, a preliminary surface structure substrate 210a was formed, which includes an array of projected nearly-spherical portions formed by undercut. The height of each projected portion was about 30 µm, the diameter of the flat upper end of the projected portion was 0.2 mm, and the diameter of the base of each projected portion was 0.55 mm.

Compared with the preliminary surface structure fabricated by sandblasting in the third example, the preliminary surface structure in the present example deviated from the object shape just by the amount of undercut.

Because the surface of the preliminary surface structure 210a was rough, it could not be used directly in optical applications.

The mold 120a described in the third example was used.

The procedure for fabricating the optical element 100 was the same as that in the third example, and below only some of the steps are described with reference to FIGS. 14A through 14D.

Figure 14A:
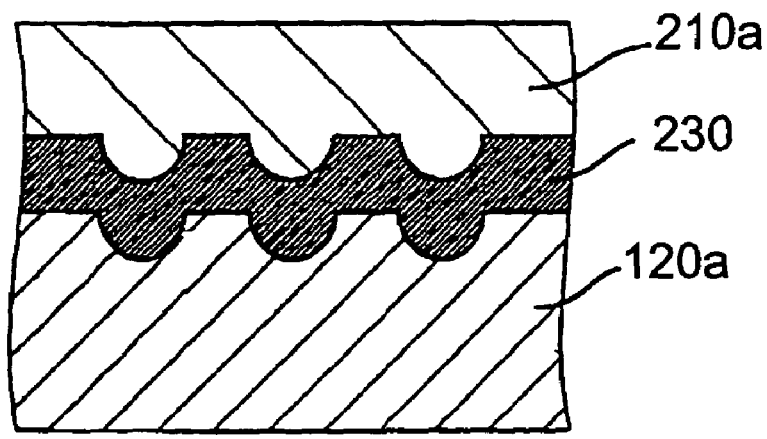
FIGS. 14A through 14D are cross-sectional views showing the steps of fabricating the optical element 100 in the fourth and fifth examples.

In the step shown in FIG. 14A, a UV curable resin 230 was applied on the silicon mold 120a, and the preliminary surface structure substrate 210a (silica) was pressed against the mold 120a with the resin 230 in between.

For this example, the same as in the third example, an acrylic resin GRANDIC RC-8720 of Dainippon Ink and Chemicals, Incorporated, was used as the UV curable resin 230, and the volume of the applied UV curable resin 230 was 3 cc.

Figure 14B:
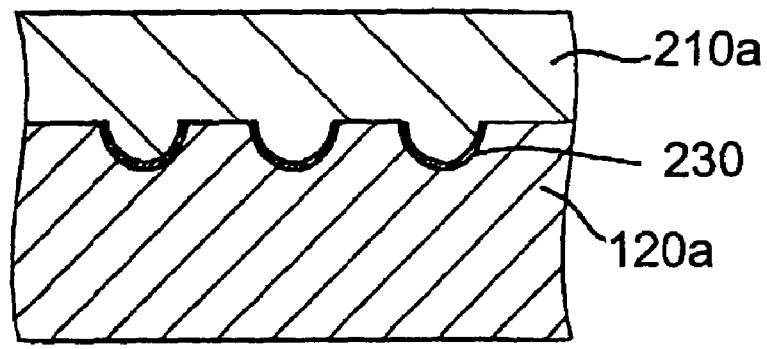

In the step shown in FIG. 14B for curing the UV curable resin 230, the same as in the third example, the upper side of the preliminary surface structure substrate 210a was uniformly irradiated by ultraviolet light in a dose of 3000 mJ (the power was 10 mW) for 5 minutes (300 seconds) to cure the UV curable resin 230.

After curing, the thickness of the UV curable resin layer 230 between the preliminary surface structure substrate 210a and mold 120a was nearly a constant, and was around 12 µm.

Figure 14C:
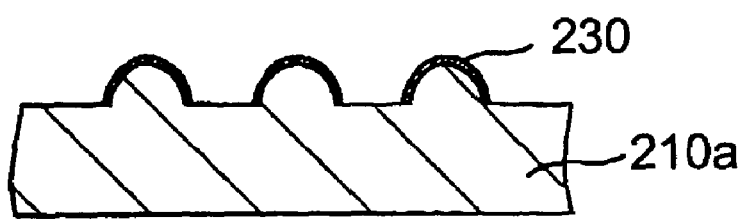

Next, in the step shown in FIG. 14C, in order to separate the UV curable resin 230 from the mold 220a while keeping the resin 230 being bonded with the preliminary surface structure substrate 210a, the silicon mold 220a, which had a low rigidity, was deformed to be slightly convex using jigs, and the UV curable resin 230 bonded with the preliminary surface structure substrate 210a was stripped from the silicon mold 220a.

The shape of the resin layer 230 on the preliminary surface structure substrate 210a was measured. It was found that the depths of the convex lens portions of the resin 230 reduced to 11.60 µm. This reduction was due to shrinkage of the resin 230 during curing. The rate of shrinkage of the resin 230 was about 5% on average. It reveals that the rate of shrinkage was successfully lowered by irradiating ultraviolet light for a longer time. It is important to precisely measure the depth by an optical shape measurement device (that is, a non-contact measurement), and appropriately specify the selection ratios and other etching conditions while considering their variations with time in step shown in FIG. 14D. However, compared with the third example, the deviation from the object shape was large because of shrinkage of the resin at the inclined surface.

Figure 14D:
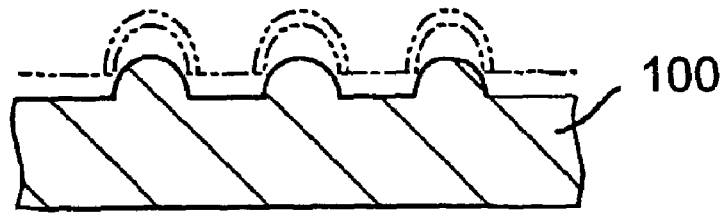

Next, in the step shown in FIG. 14D, in a similar way with the third example, the surface shape of the resin layer 230 on the preliminary surface structure substrate 210a was transferred to the preliminary surface structure substrate 210a by dry etching, and the optical element 100, the final article, was obtained. Specifically, a TCP etching device was used, and etching was performed for 30.0 minutes with a gas of CHF$_3$ and a gas of CF$_4$ being fed at flow rates of 12.0 sccm and 4.0 sccm, respectively. The power of the substrate bias was 500 W, the power of the upper electrode was 1250 W, and the vacuum was $1.0 \times 10^{-3}$ Torr. The etching depth was 13 µm, and etching speed was 0.43 µm/minute.

In the later half of the etching process, the flow rate of the CHF$_3$ gas was increased by 2.0 sccm to raise the selection ratio slightly. By changing the selection ratio gradually, transfer of the desired shape was achieved. The selection ratio during the above etching was 1.05 on average, and the height of the lens portions after etching was 40.0 µm. The roughness Ra of the surface of the optical element 100 was 0.001 µm, and it was a sufficiently good value. In addition, the optical surface was non-spherical.

Comparing the surface shape of the optical element 100 with the surface shape transferred to the resin layer 230, the pitches of them were the same, but the height of the surface shape of the optical element 100 was 1.05 times that of the surface shape of the resin, that is, the object shape was achieved.

In the same way as the third example, by repeating the above steps, lenses 102 were formed on the two sides of the silica substrate 210a, and the optical element 100 shown in FIGS. 6A and 6B, or in FIGS. 7A and 7B was obtained.

FIFTH EXAMPLE

A fifth example of a method of fabricating the optical element 100 is described below.

In this example, the preliminary surface structure substrate was formed by a method different from the previous examples.

When fabricating a preliminary surface structure in this example, first, coarse processing was performed by using dry etching to form a gross outline of the preliminary surface structure. In this step, a transmittance variable mask was used, which was prepared beforehand for making the optical element in this example. Specifically, a photo-conducting material was applied to a thickness of 25.0 µm. The photo-conducting material used here was the product TGMR-950 of Tokyo Ohka Kogyo Co. Ltd. After lithography using the above mask and developing, the substrate was cleaned. Subsequent to post-baking, the substrate was further etched by dry etching with the average selection ratio set to 1.47. Then, the surface shape was transferred to the final article material (silica substrate). The resulting final height was 30.1 µm.

In this example, when fabricating the optical element 100, the preliminary surface structure substrate fabricated in the above way and a silicon mold same as the mold 220a as shown in the third example were used.

The following procedure for fabricating the optical element 100 is the same as that shown in FIGS. 14A through 14C. Below, a description is made without referring figures, or with reference to FIGS. 14A through 14C for clarity where necessary.

First, the mold 220a after a de-molding treatment was set with the side having the surface structure on the upper side, and a UV curable resin (for this example, the resin 230 in FIGS. 14A and 14B) was applied on the mold 220a. For this example, an acrylic resin GRANDIC RC-8720 of Dainippon Ink and Chemicals, Incorporated, was used as the UV curable resin, and the volume of the applied UV curable resin was 3 cc.

Next, the silicon mold 220a was set into a bonding machine, whereby the preliminary surface structure substrate fabricated above of the optical element 100 was pressed against the silicon mold 220a slowly and was bonded with the mold 220a. The preliminary surface structure substrate had been subjected to a silane coupling treatment in advance to improve the adhesion between the resin and the surface of the preliminary surface structure substrate. In this example, the preliminary surface structure substrate was made from synthetic silica manufactured by Shin-Etsu Quartz Products Co. Ltd. In order that bubbles were not generated in the UV curable resin, the speed of moving downward the preliminary surface structure substrate was controlled by the bonding machine.

On the surface of the preliminary surface structure substrate and the surface of the silicon mold 220a, metal films were formed, respectively, opposed to each other, for this example, in dragonfly shapes. These patterns were used as marks for position alignment when pressing the preliminary surface structure substrate downward against the silicon mold 220a.

Then, the silicon mold 220a was pressing up slowly against the preliminary surface structure substrate, and the excessive UV curable resin unnecessary in shape transfer was removed from the periphery of the silicon mold 220a and the preliminary surface structure substrate.

Subsequently, the upper side of the silica material 210a was uniformly irradiated by ultraviolet light in a dose of 3000 mJ (the power was 10 mW) for 5 minutes (300 seconds) to cure the UV curable resin.

After curing, the thickness of the UV curable resin layer 230 was about 10 μm.

Next, in order to separate the UV curable resin from the mold 220a while keeping the resin being bonded with the preliminary surface structure substrate, the silicon mold 220a, which had a low rigidity, was deformed to be slightly convex using jigs, and the UV curable resin bonded with the preliminary surface structure substrate was stripped from the silicon mold 220a while keeping the silicon mold 220a a convex shape.

The shape of the resin layer on the preliminary surface structure substrate was measured. It was found that the heights of the convex lens portions of the resin layer reduced to 9.6 μm. The reduction of the height was due to shrinkage of the resin during curing, and the rate of shrinkage was about 4% on average. It reveals that the rate of shrinkage was successfully lowered by irradiating ultraviolet light for a longer time. It is important to precisely measure the depth by an optical shape measurement device (that is, a non-contact measurement), and appropriately specify the selection ratios and other etching conditions while considering their variations with time in the next step.

Next, similar to the third example, the surface shape transferred to the resin layer on the preliminary surface structure substrate was transferred to the preliminary surface structure substrate (silica material) by dry etching, and the optical element 100, the final article, was obtained. Specifically, a TCP etching device was used, and etching was performed for 25.0 minutes with a gas of $CHF_3$ and a gas of $CF_4$ being fed at flow rates of 12.0 sccm and 4.0 sccm, respectively. The power of the substrate bias was 500 W, the power of the upper electrode was 1250 W, and the vacuum was $1.0 \times 10^{-3}$ Torr. The etching depth was 11 μm, and the etching speed was 0.44 μm/minute.

In the later half of the etching process, using an auto pressure controller (APC), the vacuum was increased continuously from 3 mTorr to 1.0 mTorr, and this lowered the gas pressure continuously and raised the selection ratio four times as time elapsed. By changing the selection ratio gradually, transfer of the desired shape was achieved. The selection ratio during the above etching was 1.05 on average, and the height of the surface shape of the final article after etching was 40.0 μm. The roughness Ra of the surface of the final article was 0.001 μm, and it was a sufficiently good value. In addition, the optical surface was non-spherical.

Comparing the surface shape of the optical element 100 with the shape on the resin layer, the pitches were the same, but the height of the surface shape of the optical element was 1.05 times that of the shape on the resin layer, that is, the object shape was achieved.

In this way, lenses 102 were formed on one side of the silica substrate 110, as shown in FIGS. 6A and 6B, or in FIGS. 7A and 7B.

The lenses 102 on the other side of the preliminary surface structure substrate were formed in the same way, with the lenses 102 on one side being protected by jigs or masks. The positioning of the lenses on the two sides was achieved by positioning marks provided beforehand.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effects of the present invention, a de-molding treatment is performed on the surface of a mold having a fine surface structure, then an intermediate material is pressed against the surface of the mold with a curable resin in between, and then the surface shape of the mold is transferred to the resin; after the resin is cured, the resin is separated from the mold while being bonded with the intermediate material, and the shape transferred onto the resin is further transferred to the intermediate material by dry etching, forming an intermediate mold; the shape on the intermediate mold is further transferred to a final article material by dry etching, and resultantly, a final product having a fine surface structure is obtained. Because of the above procedure, it is easy to increase the height of the fine structure by dry etching, and it is possible to manufacture products each having a fine surface structure (high precision three dimensional surface structure) of a desired height with high precision in large quantity. In addition, because the intermediate mold is interposed, it is possible to extend the service life of the primary mold.

Further, according to the present invention, a de-molding treatment is performed on the surface of a mold having a fine surface structure, then a final article material having a preliminary surface structure is pressed against the surface of the mold with a curable resin in between, and then the surface shape of the mold is transferred to the resin; after the resin is cured, the shape transferred to the resin is further transferred to the final article material by dry etching, and a final product having a fine surface structure is obtained.

Due to the above procedure, because a preliminary surface structure of a final article is formed in advance, it is possible to decrease etching time.

This patent application is based on Japanese Priority Patent Application No. 2002-271253 filed on Sep. 18, 2002, and No. 2003-156094 filed on Jun. 2, 2003, the entire contents of which are hereby incorporated by reference.

What is claimed is:

1. A method for fabricating an article from an object material including an object fine surface structure thereon having an object size, the method comprising:

fabricating a first mold from a first material, said first mold including a fine surface structure corresponding to the object fine surface structure and having a first size less than the object size;

fabricating a second mold by transferring the fine surface structure of the first mold to a second material so that the fine surface structure transferred to the second material has a second size greater than the first size and less than the object size;

fabricating the article by transferring the fine surface structure of the second mold to the object material so that the fine surface structure transferred to the object material has the object size, wherein the fabricating of the second mold comprises:

applying a first curable resin onto the first mold to cover the fine surface structure thereof, and pressing the second material against the first mold with the first curable resin in between to transfer the fine surface structure of the first mold to the first curable resin;

curing at least a portion of the first curable resin;

separating the first curable resin from the first mold with the first curable resin being bonded with the second material; and transferring the fine surface structure of the first curable resin to the second material by dry-etching to form the second mold; and the fabricating of the article comprises:

applying a second curable resin onto the second mold to cover the fine surface structure thereof and pressing the object material against the second mold with the second curable resin in between to transfer the fine surface structure of the second mold to the second curable resin;

curing at least a portion of the second curable resin;

separating the second curable resin from the second mold with the second curable resin being bonded with the object material; and transferring the fine surface structure of the second curable resin to the object material by dry-etching to form the article.

2. The method as claimed in claim 1, further comprising:

performing a first de-molding treatment on the first mold to facilitate separation of the first curable resin from the first mold after the curing of at least a portion of the first curable resin and before the fabricating of the second mold; and performing a second de-molding treatment on the second mold to facilitate separation of the second curable resin from the second mold after the fabricating of the second mold and before the fabricating of the article.

3. The method as claimed in claim 1, wherein before the fabricating of the article, the curing of at least a portion of the first curable resin and the fabricating of the second mold are repeated a plurality of times to fabricate a plurality of second molds.

4. The method as claimed in claim 1, wherein the transferring of fine surface structure of the first curable resin includes a changing a dry-etching selection ratio of etching the first curable resin and the second material; and the transferring of fine surface structure of the second curable resin includes changing a dry-etching selection ratio of etching the second curable resin and the object material.

5. The method as claimed in claim 4, wherein in each of the first transferring of the fine surface structure of the first curable resin and the transferring of the fine surface structure of the second curable resin, the dry-etching selection ratio varies with time.

6. The method as claimed in claim 1, wherein at least one of the first curable resin and the second curable resin includes a light curable resin; and at least one of the first material and the second material, and one of the second material and the object material sandwiching the light curable resin, include a light transmittable material, and the light curable resin is cured in the curing of at least a portion of the first curable resin and the curing of at least a portion of the second curable resin by irradiating light through the light transmittable material.

7. The method as claimed in claim 6, wherein the light curable resin is an ultraviolet light curable resin; and the light transmittable material is an ultraviolet light transmittable material; and the light curable resin is cured by irradiating ultraviolet light through the ultraviolet light transmittable material.

8. The method as claimed in claim 1, wherein at least one of the first material and the second material includes silicon.

9. The method as claimed in claim 1, wherein the first mold is made from a material capable of being processed by dry-etching including one of a metallic material, a glass material, a ceramic material, a plastic material, and a hard rubber material; and the fine surface structure of the first mold is formed by one of dry-etching and lithography.

10. The method as claimed in claim 1, wherein the first mold is fabricated by forming the fine surface structure on a plate made from the first material.

11. The method as claimed in claim 1, wherein the transferring of fine surface structure of the second curable resin includes determining the second size of the fine surface structure of the second mold in such a way as to include an amount of shrinkage of the second curable resin during the curing of at least a portion of the second curable resin.

12. The method as claimed in claim 2, further comprising steps of:

performing a first surface treatment on the surface of the first mold having the fine surface structure to improve adhesion between the first curable resin and the second material after the first de-molding treatment and before the fabricating of the second mold; and performing a second surface treatment on the surface of the second mold having the fine surface structure to improve adhesion between the second curable resin and the object material after the second de-molding treatment and before the fabricating of the article.

13. The method as claimed in claim 1, wherein the first step comprises steps of:

applying a photo-conducting material onto a surface of the first material;

irradiating light onto the photo-conducting material using a mask having a light transmittance distribution, and developing the photo-conducting material to form a predetermined pattern on the photo-conducting material; and transferring the pattern on the mask to the first material by dry-etching.

14. The method as claimed in claim 1, wherein the fabricating of the first mold includes forming a channel on the first mold for an uncured portion of the first curable resin surrounding the cured portion of the first curable resin to flow in to fill in a space generated due to shrinkage of the first curable resin during curing; and the fabricating of the second mold includes of forming a channel on the second mold for the uncured portion of the second curable resin surrounding the cured portion of the second curable resin to flow in to fill in a space generated due to shrinkage of the second curable resin during curing.

15. A method for fabricating an article from an object material including an object fine surface structure, the method comprising:

fabricating a surface structure substrate by forming a preliminary surface structure on the object material, said preliminary surface structure having a size slightly smaller than the object fine surface structure;

fabricating a mold from a mold material, the mold including a fine surface structure inverted to the object fine surface structure and having a size nearly equal to the size of the object fine surface structure; and transferring the inverted fine surface structure of the mold to the surface structure substrate in alignment with the preliminary surface structure on the surface structure substrate, wherein the transferring the surface structure comprises:

applying a curable resin onto the mold to cover the inverted fine surface structure and pressing the surface structure substrate against the mold with the curable resin in between to transfer the inverted fine surface structure of the mold to the curable resin;

curing at least a portion of the curable resin;

separating the curable resin from the mold with the curable resin being bonded with the surface structure substrate; and transferring the fine surface structure of the curable resin to the surface structure substrate by dry-etching to form the article with the fine surface structure of the curable being in alignment with the preliminary surface structure.

16. The method as claim in claim 15, wherein in fabricating the surface structure substrate, the preliminary surface structure is formed by a method including at least one of sandblasting, dry etching, wet etching, dicing, polishing, cutting, sol-gel method, glass bonding, and thin film formation including vacuum evaporation, sputtering, and CVD (Chemical Vapor Deposition).

17. The method as claimed in claim 15, further comprising performing, after the fabricating of the mold and before the fabricating of the article, a de-molding treatment on a surface of the mold having the fine surface structure to facilitate separation of the curable resin from the mold in the separating of the curable resin from the mold.

18. The method as claimed in claim 15, wherein the transferring step of the fine surface of the curable resin includes changing a dry-etching selection ratio of etching the curable resin and the object material.

19. The method as claimed in claim 18, wherein the dry-etching selection ratio varies with time.

20. The method as claimed in claim 15, wherein the curable resin includes a light curable resin;

at least one of the mold material and the object material sandwiching the curable resin includes a light transmittable material; and the curable resin is cured in the curing step by irradiating light through the light transmittable material.

21. The method as claimed in claim 20, wherein the light curable resin is an ultraviolet light curable resin; and the light transmittable material is an ultraviolet light transmittable material; and the light curable resin is cured by irradiating ultraviolet light through the ultraviolet light transmittable material.

22. The method as claimed in claim 15, wherein the mold is made from a material capable of being processed by dry-etching; and the fine surface structure of the mold is formed by one of dry-etching and lithography.

23. The method as claimed in claim 15, wherein the mold is fabricated by forming the fine surface structure on a plate made from the mold material.

24. The method as claimed in claim 15, wherein a size of the fine surface structure of the mold is determined to include an amount of shrinkage of the curable resin during the curing step.

25. The method as claimed in claim 17, further comprising of performing, after the de-molding treatment and before the fabricating of the article, a surface treatment on the surface of the mold having the fine surface structure to improve adhesion between the curable resin and the object material.

* * * * *